(12) United States Patent
Higuchi et al.

(10) Patent No.: US 8,174,523 B2
(45) Date of Patent: May 8, 2012

(54) DISPLAY CONTROLLING APPARATUS AND DISPLAY CONTROLLING METHOD

(75) Inventors: Yasukazu Higuchi, Kanagawa (JP); Isao Mihara, Tokyo (JP); Masahiro Sekine, Tokyo (JP); Norihiro Nakamura, Kanagawa (JP); Yasunobu Yamauchi, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 333 days.

(21) Appl. No.: 12/461,924

(22) Filed: Aug. 27, 2009

(65) Prior Publication Data

US 2010/0058213 A1 Mar. 4, 2010

(30) Foreign Application Priority Data

Aug. 28, 2008 (JP) ................................ 2008-220558

(51) Int. Cl.
*G06T 15/00* (2011.01)
*G06T 1/00* (2006.01)
*G06F 17/00* (2006.01)

(52) U.S. Cl. ...................................... 345/419; 345/418

(58) Field of Classification Search .................. 345/418, 345/419
See application file for complete search history.

(56) References Cited

U.S. PATENT DOCUMENTS

| | | | |
|---|---|---|---|
| 6,628,313 B1 | 9/2003 | Minakuchi et al. | |
| 6,646,980 B1 | 11/2003 | Yamamoto et al. | |
| 6,853,389 B1 | 2/2005 | Ikeda | |
| 6,956,812 B2 | 10/2005 | Okada et al. | |
| 7,245,677 B1 | 7/2007 | Pare, Jr. | |
| 7,519,121 B2 | 4/2009 | Matsushita et al. | |
| 7,590,948 B2 | 9/2009 | Narita et al. | |
| 2003/0142115 A1* | 7/2003 | Endo et al. .................... 345/633 |
| 2005/0010599 A1 | 1/2005 | Kake et al. | |
| 2005/0076361 A1 | 4/2005 | Choi et al. | |
| 2005/0210410 A1 | 9/2005 | Ohwa et al. | |
| 2007/0106661 A1 | 5/2007 | Narita et al. | |
| 2007/0106949 A1 | 5/2007 | Narita et al. | |
| 2008/0235729 A1 | 9/2008 | Doi et al. | |
| 2008/0267582 A1 | 10/2008 | Yamauchi et al. | |

(Continued)

FOREIGN PATENT DOCUMENTS

EP 1 051 034 11/2000

(Continued)

OTHER PUBLICATIONS

Mihara et al., U.S. Appl. No. 12/076,439, filed Mar. 18, 2008.

(Continued)

*Primary Examiner* — Jacinta M Crawford

(74) *Attorney, Agent, or Firm* — Nixon & Vanderhye, P.C.

(57) ABSTRACT

A display controlling apparatus stores therein first position information of pieces of data in a predetermined n-dimensional virtual space displayed on a display device, specifies second position information in the virtual space indicating positions of the pieces of data obtained after performing a rearranging process thereon, specifies intermediate position information indicating positions in a m-dimensional virtual space corresponding to a period during which the data is rearranged from the first-position-information positions into the second-position-information positions, the m being smaller than the n by 1 or more, calculates first transition paths in transitions from the first-position-information positions to the intermediate-position-information positions, calculates second transition paths in transitions from the intermediate-position-information positions to the second-position-information positions, and outputs display screen information containing the pieces of data that go through the transitions in the virtual spaces according to the first and the second transition paths.

17 Claims, 22 Drawing Sheets

U.S. PATENT DOCUMENTS

| | | |
|---|---|---|
| 2009/0019031 A1 | 1/2009 | Krovitz et al. |
| 2009/0080698 A1 | 3/2009 | Mihara et al. |
| 2009/0083814 A1 | 3/2009 | Sekine et al. |
| 2010/0054703 A1 | 3/2010 | Tanaka et al. |
| 2010/0057696 A1 | 3/2010 | Miyazawa et al. |
| 2010/0057722 A1 | 3/2010 | Nakamura et al. |
| 2010/0058173 A1 | 3/2010 | Kizuka et al. |
| 2010/0058213 A1 | 3/2010 | Higuchi et al. |
| 2010/0058388 A1 | 3/2010 | Baba et al. |
| 2010/0156893 A1 | 6/2010 | Mihara et al. |

FOREIGN PATENT DOCUMENTS

| | | |
|---|---|---|
| EP | 1 513 341 | 9/2005 |
| EP | 1 785 814 | 5/2007 |
| EP | 2 159 713 | 3/2010 |
| EP | 2 159 722 | 3/2010 |
| EP | 2 160 032 | 3/2010 |
| EP | 2 166 752 | 3/2010 |
| JP | 09-219835 | 8/1997 |
| JP | 11-003346 | 1/1999 |
| JP | 11-249774 | 9/1999 |
| JP | 2000-076267 | 3/2000 |
| JP | 2000-242648 | 9/2000 |
| JP | 2000-305946 | 11/2000 |
| JP | 2001-292383 | 10/2001 |
| JP | 2001-326881 | 11/2001 |
| JP | 2002-175269 | 6/2002 |
| JP | 2002-175321 | 6/2002 |
| JP | 2002-209178 | 7/2002 |
| JP | 2003-330969 | 11/2003 |
| JP | 2004-178085 | 6/2004 |
| JP | 2004-258390 | 9/2004 |
| JP | 2005-010854 | 1/2005 |
| JP | 2005-267390 | 9/2005 |
| JP | 2006-094520 | 4/2006 |
| JP | 2007-066285 | 3/2007 |
| JP | 2007-148669 | 6/2007 |
| JP | 2007-249641 | 9/2007 |
| JP | 2007-272651 | 10/2007 |
| JP | 2008-130032 | 6/2008 |
| JP | 2008-134725 | 6/2008 |
| JP | 2008-242504 | 10/2008 |
| JP | 2009-080580 | 4/2009 |
| WO | WO 00/33572 | 6/2000 |

OTHER PUBLICATIONS

Sekine et al., U.S. Appl. No. 12/232,186, filed Sep. 11, 2008.
Tanaka et al., U.S. Appl. No. 12/416,786, filed Apr. 1, 2009.
Kizuka et al., U.S. Appl. No. 12/418,474, filed Apr. 3, 2009.
Baba et al., U.S. Appl. No. 12/426,756, filed Apr. 20, 2009.
Miyazawa et al., U.S. Appl. No. 12/431,663, filed Apr. 28, 2009.
Nakamura et al., U.S. Appl. No. 12/461,761, filed Aug. 24, 2009.
Higuchi et al., U.S. Appl. No. 12/585,269, filed Sep. 9, 2009.
Mihara et al., U.S. Appl. No. 12/585,458, filed Sep. 15, 2009.
Yoshiyuki Kokojima et al., "Resolution Independent Rendering of Deformable Vector Objects Using Graphics Hardware", Sketches, Siggraph, (2006).
Masaru Suzuki et al., "Sasatto Search" Human Interface Technology for Information Retrieval, Toshiba Review vol. 62, No. 12, 2007, pp. 54-57.
Loviscach, "Motion Blur for Textures by Means of Anisotropic Filtering," Eurographics Symposium on Rendering (2005), pp. 105-110.
Takeuchi et al., "Motion sharpening in moving natural images," Journal of Vision (2002), 2:377 (Abstract).
Brostow et al., "Image-Based Motion Blur for Stop Motion Animation", Proc. of Siggraph '01, pp. 561-566, (2001).
Ramos, et al., "Fluid Interaction Techniques for the Control and Annotation of Digital Video", Proceedings of the 16$^{th}$ annual ACM Symposium on User Interface Software and Technology, vol. 5, Issue 2, pp. 105-114, (2003).
Irani et al., "Efficient Representations of Video Sequence and Their Applications", Signal processing Image Communication (Journal), pp. 1-39, (1996).
Teodosio et al., "Salient Stills", ACM Transaction on Multimedia Computing, Communications and Appllications, pp. 16-36, (2005).
Agarwala et al., "Interactive Digital Photomontage", ACM Siggraph, pp. 1-9, (2004).
Huan-Bo Luan et al., Interactive Spatio-Temporal Visual Map Model Web Video Retrieval, Multimedia and Expo, 2007, IEEE International Conference on, IEEE, P1, Jul. 1, 2007, pp. 560-563, ISBN: 978-1-4244-1016-3. (Abstract).
U.S. Appl. No. 12/426,756, filed Apr. 20, 2009.
U.S. Appl. No. 12/431,663, filed Apr. 28, 2009.
U.S. Appl. No. 12/416,786, filed Apr. 1, 2009.
U.S. Appl. No. 12/418,474, filed Apr. 3, 2009.

* cited by examiner

FIG.12

| DATA IDENTIFIERS | BROADCAST STATIONS | GENRES | BROADCAST PERIODS ||
|---|---|---|---|---|
| | | | BROADCAST STARTING TIME | BROADCAST ENDING TIME |
| 2 | 1 | DRAMA | 2008/10/01 - 19:00 | 2008/10/01 - 20:00 |
| 32 | 4 | NEWS | 2008/10/01 - 20:30 | 2008/10/01 - 20:35 |
| 35 | 4 | DRAMA | 2008/10/01 - 20:35 | 2008/10/01 - 21:30 |
| 51 | 2 | SPORTS | 2008/10/01 - 19:00 | 2008/10/01 - 21:00 |
| 68 | 1 | NEWS | 2008/10/01 - 20:30 | 2008/10/01 - 21:30 |
| 70 | 3 | EDUCATIONAL | 2008/10/01 - 20:00 | 2008/10/01 - 21:30 |
| 105 | 3 | VARIETY SHOW | 2008/10/01 - 20:15 | 2008/10/01 - 21:15 |
| 124 | 1 | VARIETY SHOW | 2008/10/01 - 20:00 | 2008/10/01 - 20:30 |
| 187 | 2 | VARIETY SHOW | 2008/10/01 - 21:00 | 2008/10/01 - 21:15 |
| 654 | 4 | DRAMA | 2008/10/01 - 19:00 | 2008/10/01 - 20:30 |
| 1007 | 2 | VARIETY SHOW | 2008/10/01 - 21:15 | 2008/10/01 - 21:30 |
| 1504 | 3 | MUSIC | 2008/10/01 - 19:00 | 2008/10/01 - 20:00 |

FIG.13

| SLOT NUMBERS | POSITIONS || SIZES || CORRESPONDING AXIS NUMBERS | AXIS ORDER NUMBERS |
|---|---|---|---|---|---|---|
| | X | Y | X | Y | | |
| 1 | 0 | 0 | 1 | 1 | 1 | 1 |
| 2 | 2 | 0 | 1 | 1 | 1 | 2 |
| 3 | 4 | 0 | 1 | 1 | 1 | 3 |
| 4 | 0 | 1.5 | 1 | 1 | 2 | 1 |
| 5 | 2 | 1.5 | 1 | 1 | 2 | 2 |
| 6 | 4 | 1.5 | 1 | 1 | 2 | 3 |
| 7 | 0 | 3 | 1 | 1 | 3 | 1 |
| 8 | 2 | 3 | 1 | 1 | 3 | 2 |
| 9 | 4 | 3 | 1 | 1 | 3 | 3 |
| 10 | 0 | 4.5 | 1 | 1 | 4 | 1 |
| 11 | 2 | 4.5 | 1 | 1 | 4 | 2 |
| 12 | 4 | 4.5 | 1 | 1 | 4 | 3 |

FIG.14

| AXIS NUMBER | CORRESPONDING DATA ATTRIBUTES | | | ALIGNMENT RULES | |
|---|---|---|---|---|---|
| | ATTRIBUTES | STARTING VALUE | ENDING VALUE | ATTRIBUTES | ORDER |
| 1 | BROADCAST STATION | CHANNEL 1 | – | BROADCAST STARTING TIME | ASCENDING ORDER |
| 2 | BROADCAST STATION | CHANNEL 2 | – | BROADCAST STARTING TIME | ASCENDING ORDER |
| 3 | BROADCAST STATION | CHANNEL 3 | – | BROADCAST STARTING TIME | ASCENDING ORDER |
| 4 | BROADCAST STATION | CHANNEL 4 | – | BROADCAST STARTING TIME | ASCENDING ORDER |

FIG.15

| DATA IDENTIFIERS | BROADCAST STATIONS | GENRES | BROADCAST PERIODS | | POSITIONS | | SIZES | |
|---|---|---|---|---|---|---|---|---|
| | | | BROADCAST STARTING TIME | BROADCAST ENDING TIME | X | Y | X | Y |
| 2 | 1 | DRAMA | 2008/10/01 - 19:00 | 2008/10/01 - 20:00 | 0 | 0 | 1 | 1 |
| 124 | 1 | VARIETY SHOW | 2008/10/01 - 20:00 | 2008/10/01 - 20:30 | 2 | 0 | 1 | 1 |
| 68 | 1 | NEWS | 2008/10/01 - 20:30 | 2008/10/01 - 21:30 | 4 | 0 | 1 | 1 |
| 51 | 2 | SPORTS | 2008/10/01 - 19:00 | 2008/10/01 - 21:00 | 0 | 1.5 | 1 | 1 |
| 187 | 2 | VARIETY SHOW | 2008/10/01 - 21:00 | 2008/10/01 - 21:15 | 2 | 1.5 | 1 | 1 |
| 1007 | 2 | VARIETY SHOW | 2008/10/01 - 21:15 | 2008/10/01 - 21:30 | 4 | 1.5 | 1 | 1 |
| 1504 | 3 | MUSIC | 2008/10/01 - 19:00 | 2008/10/01 - 20:00 | 0 | 3 | 1 | 1 |
| 70 | 3 | EDUCATIONAL | 2008/10/01 - 20:00 | 2008/10/01 - 21:30 | 2 | 3 | 1 | 1 |
| 105 | 3 | VARIETY SHOW | 2008/10/01 - 20:15 | 2008/10/01 - 21:15 | 4 | 3 | 1 | 1 |
| 654 | 4 | DRAMA | 2008/10/01 - 19:00 | 2008/10/01 - 20:30 | 0 | 4.5 | 1 | 1 |
| 32 | 4 | NEWS | 2008/10/01 - 20:30 | 2008/10/01 - 20:35 | 2 | 4.5 | 1 | 1 |
| 35 | 4 | DRAMA | 2008/10/01 - 20:35 | 2008/10/01 - 21:30 | 4 | 4.5 | 1 | 1 |

IN ORDER OF DISTANCE
DISPLAY DATA 1703 → DISPLAY DATA 1705 → DISPLAY DATA 1704

IN ORDER OF TRANSITION DIRECTION
DISPLAY DATA 1901 → DISPLAY DATA 1903 → DISPLAY DATA 1902

| TRANSITION ORDER NUMBERS | DATA IDENTIFIERS | PRE-TRANSITION POSITIONS | | | POST-TRANSITION POSITIONS | | |
|---|---|---|---|---|---|---|---|
| | | X | Y | Z | X | Y | Z |
| 1 | 32 | 0 | 1 | 3 | 0 | 0 | 3 |
| 2 | 2 | 4 | 1 | 2 | 2 | 0 | 2 |
| 3 | 654 | 6 | 2 | 2 | 0 | 0 | 0 |

FIG.23

| AXIS NUMBERS | AXIS DIRECTIONS | STARTING POINTS | LENGTHS |
|---|---|---|---|
| 1 | (1, 0) | (0, 0) | 4 |
| 2 | (0, 1) | (0, 0) | 3 |

FIG.24

| CORRESPONDING AXES | DATA ATTRIBUTES | ATTRIBUTE VALUES | |
| | | VALUES | POSITIONS |
|---|---|---|---|
| 1 | BROADCAST STATIONS | (CHANNEL 1), (CHANNEL 2), (CHANNEL 3), (CHANNEL 4) | (0.125), (0.375), (0.625), (0.875) |
| 2 | BROADCAST PERIODS | (2008/10/01 - 19:00, 2008/10/01 - 21:30) | (1, 0) |

DISPLAY CONTROLLING APPARATUS AND DISPLAY CONTROLLING METHOD

CROSS-REFERENCE TO RELATED APPLICATIONS

This application is based upon and claims the benefit of priority from the prior Japanese Patent Application No. 2008-220558, filed on Aug. 28, 2008; the entire contents of which are incorporated herein by reference.

BACKGROUND OF THE INVENTION

1. Field of the Invention

The present invention relates to a display controlling apparatus and a display controlling method with which it possible to make transitions on positions of displayed data.

2. Description of the Related Art

These days, as digital devices such as PCs, HDD recorders, TVs, mobile phones, PDAs, and vehicle navigation systems have come into wide use, users have more and more opportunities to select data being displayed on a display screen.

In addition, because the capacity of storage media such as HDDs has become larger and broadband networks have become popular, the number of pieces of information and the types of information provided by the data displayed on a display screen as a selection target have also increased.

Due to these trends, methods for enabling users to select desired data on a display screen have become of greater importance. Search functions that have conventionally been used in PCs and the like are known as a method that enables the users to select desired data out of a large amount of data. By using such search functions, the users are able to efficiently find necessary information, if they have clear understanding as to what information they desire to find.

In the case where a large amount of data is the search targets, the data that a user is looking for can also be ambiguous in many situations. In those situations, it is difficult for the user to even define the conditions used for specifying the data. As a result, it is difficult for the user to efficiently search for the necessary data by using the search functions.

In contrast, there are also other methods by which the users are allowed to visually select necessary data while data is being displayed in a list view. When those methods are used, even if a user does not have clear understanding as to what data he/she desires to find, the user is able to specify the necessary data by directly checking each data. By making the process of checking each data easier, it is possible to allow the user to specify the necessary data efficiently. In other words, to enable the user to efficiently specify the necessary data out of a list-view display, what method is used for displaying the data is important.

Another background to be considered is that advanced presentation methods that employ 3D graphics, animations, and typography that can be used in display of data have become popular due to improvements in the performance of processors and the growing popularity of broadband networks. Improving the quality of user experience by applying these methods to operation screens and make the display richer is in demand. In particular, displays that employ 3D graphics and interactive animations in response to user's operations allow the changes in the screen display to be continuous in response to the user's operations. As a result, it is possible to cause the user to have the feeling of intuitive operations.

Examples of the display methods that employ 3D graphics and animations that have been proposed include "walk-through" and a displayed-object layout-changing animation. "Walk-through" is a method for allowing the user to find data while the viewpoint is changed as if the viewer was walking around in a virtual three-dimensional space in which data is placed. In contrast, the displayed-object layout-changing animation is a method for allowing the user to find desired data while the layout of the displayed objects is changed according to the user's operations.

Of these methods, the displayed-object layout-changing animation method is more dynamic than "walk-through" in terms of the changes in what is being displayed and is thus able to achieve a higher level of visual effects. In addition, by combining a search function or a sorting function with calculations of the layout of the displayed objects, it is possible to select the data to be displayed. Thus, the user is able to find desired information efficiently.

An example of a method for displaying displayed objects is disclosed in International Publication No. WO 00/33572. This document discloses a method for sequentially enlarging a plurality of images in a time-series sequence so that the chronological relationship among the images can be expressed and displaying the enlarged images in a spiral in the time-series sequence starting from the inner circumference side.

However, to change the display in response to the user's operations, it is necessary to change the relationship between pieces of data in a dynamic manner according to the user's operations. Thus, the method described in International Publication No. WO 00/33572 is not able to address this need.

SUMMARY OF THE INVENTION

According to one aspect of the present invention, a display controlling apparatus includes a storing unit that stores first position information of pieces of data positioned in a predetermined n-dimensional virtual space to be displayed on a display device; a specifying unit that specifies second position information in the virtual space, as information indicating positions of the pieces of data obtained after performing a rearranging process; an intermediate specifying unit that specifies intermediate position information indicating temporary positions of the pieces of data corresponding to a time period during which the pieces of data are rearranged from positions indicated by the first position information into the positions indicated by the second position information, the intermediate position information indicating the positions in a m-dimensional virtual space, the m being smaller than the n by 1 or more; a first transition calculator that calculates first transition paths of the pieces of data in transitions from the positions indicated by the first position information to the positions indicated by the intermediate position information; a second transition calculator that calculates second transition paths of the pieces of data in transitions from the positions indicated by the intermediate position information to the positions indicated by the second position information; and an output unit that outputs display screen information containing the pieces of data that go through the transitions in the virtual spaces according to the first transition paths and the second transition paths.

According to another aspect of the present invention, a display controlling apparatus includes a first display processing unit that displays, on a display device, a predetermined n-dimensional virtual space and a plurality of pieces of display data each representing a content in display positions, the display positions each indicating a position in which a corresponding one of the pieces of display data is displayed in the virtual space; a selecting unit that selects one of the pieces of display data being displayed on the display device as a piece of reference display data to be used as a reference during a rearranging process; a second display processing unit that, before the rearranging process is displayed while using the piece of reference display data selected by the selecting unit is used as a reference, changes the n-dimensional virtual space displayed on the display device to a m-dimensional virtual space, the m being smaller than the n by 1 or more, and performs a display in which transitions are made on display positions of the pieces of display data based on a predetermined rule; a specifying unit that specifies display positions of other ones of the pieces of display data in the n-dimensional virtual space, while using the piece of reference display data selected by the selecting unit as a reference; and a third display processing unit that, after the second display processing unit has performed the display in which the transitions of the display positions are made, changes the m-dimensional virtual space being displayed on the display device to the n-dimensional virtual space, and performs a display in which the pieces of display data go through transitions to be rearranged into the display positions specified by the specifying unit.

According to still another aspect of the present invention, a display controlling method includes storing first position information of pieces of data positioned in a predetermined n-dimensional virtual space to be displayed on a display device; specifying second position information in the virtual space, as information indicating positions of the pieces of data obtained after performing a rearranging process; specifying intermediate position information indicating temporary positions of the pieces of data corresponding to a time period during which the pieces of data are rearranged from positions indicated by the first position information into the positions indicated by the second position information, the intermediate position information indicating the positions in a m-dimensional virtual space, the m being smaller than the n by 1 or more; calculating first transition paths of the pieces of data in transitions from the positions indicated by the first position information to the positions indicated by the intermediate position information; calculating second transition paths of the pieces of data in transitions from the positions indicated by the intermediate position information to the positions indicated by the second position information; and outputting display screen information containing the pieces of data that go through the transitions in the virtual spaces according to the first transition paths and the second transition paths.

BRIEF DESCRIPTION OF THE DRAWINGS

FIG. 12 is a drawing illustrating an exemplary structure of a table stored in a content-attribute information storage unit 102;

FIG. 13 is a drawing for explaining a table structure of a first template management table stored in an intermediate-layout template storage unit;

FIG. 14 is a drawing for explaining a table structure of a second template management table stored in the intermediate-layout template storage unit;

FIG. 15 is a drawing illustrating an exemplary structure of a table stored in an intermediate layout storing unit;

FIG. 23 is a drawing for explaining a table structure of a first template management table stored in an intermediate-layout template storage unit according to the first modification example of the first embodiment;

FIG. 24 is a drawing for explaining a table structure of a second template management table stored in the intermediate-layout template storage unit according to the first modification example of the first embodiment;

DETAILED DESCRIPTION OF THE INVENTION

Exemplary embodiments of a display controlling apparatus and a display controlling method according to the present invention will be explained in detail, with reference to the accompanying drawings.

Figure 1:
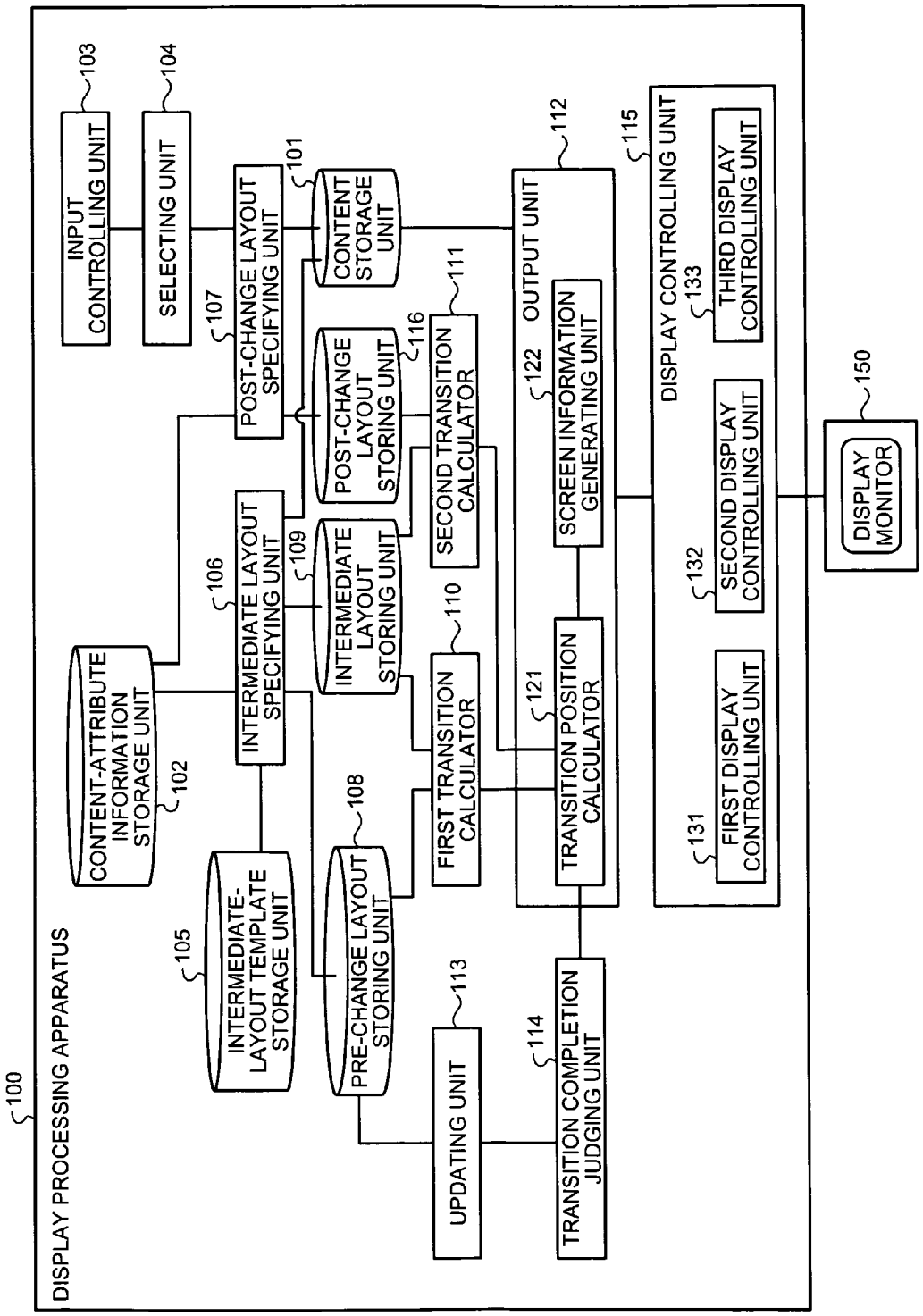
FIG. 1 is a block diagram of a display processing apparatus according to a first embodiment of the present invention.

As shown in FIG. 1, a display processing apparatus 100 according to a first embodiment of the present invention includes: a content storage unit 101; a content-attribute information storage unit 102; an input controlling unit 103; a selecting unit 104; an intermediate-layout template storage unit 105; an intermediate layout specifying unit 106; a post-change layout specifying unit 107; a pre-change layout storing unit 108; an intermediate layout storing unit 109; a post-change layout storing unit 116; a first transition calculator 110; a second transition calculator 111; an output unit 112; an updating unit 113; a transition completion judging unit 114; and a display controlling unit 115. Also, the display processing apparatus 100 is connected to a display monitor 150 that is used for displaying a display screen.

First, let us assume that the display processing apparatus 100 is an apparatus that performs a process for displaying contents such as moving image data. The display processing apparatus 100 displays, in a list view, pieces of display data each representing a content (hereinafter, "content display data"), so that one or more of the contents can be specified.

The content storage unit 101 stores the contents therein. The contents according to the first embodiment are, for example, moving image data. For instance, the content storage unit 101 stores therein a TV program that has been recorded, moving image data that has been provided through a network, and the like. There is no particular limitation regarding the formats in which the contents are stored. However, it is assumed, for example, that the contents are stored in files that have been encoded by using a known codec.

The contents may be any type of data other than moving image data. For example, the contents may be any data that is presentable to a user, such as music data, document data, or presentation files. As other examples, the contents may be data having an arbitrary attribute value, such as images, weather information, traffic information, and the like.

The display processing apparatus 100 is able to display, in a list view, the pieces of content display data representing the contents. In the example shown in FIG. 2, a position coordinate system defined in the form of a conical surface is used for displaying the pieces of content display data in a list view. A piece of content display data is laid out in each of a plurality of positions in the position coordinate system. Further, on the display screen of the display monitor 150, the position coordinate system defined in the form of the conical surface and the pieces of content display data laid out in the position coordinate system are displayed. A piece of content display data 201 and another piece of content display data 202 each represent a content (e.g., a moving image content).

Each of the pieces of content display data is display data in which information identifying the content is written. In each of the pieces of content display data, for example, the name of the content, attribute information of the content, and a thumbnail image of the content are displayed.

The piece of content display data 201 is a piece of display data that has been selected by a user or the display processing apparatus 100 and is displayed at the apex of the position coordinate system defined in the form of the conical surface. A position in the position coordinate system is specified for each of the other pieces of content display data according to the degree of relevance thereof to the piece of content display data 201, so that each piece of content display data can be displayed in the specified position.

The display processing apparatus 100 according to the first embodiment is configured so as to display the pieces of content display data in such a manner that the higher the degree of relevance to the piece of content display data 201 is, the closer to the piece of content display data 201 each of the other pieces of content display data is positioned in the display. The display processing apparatus 100 according to the first embodiment arranges the pieces of content display data in a virtual three-dimensional space related to the position coordinate system defined in the form of the conical surface and has a viewpoint (i.e., a rendering viewpoint) used for rendering the virtual space in such a manner that the viewpoint is changeable.

As a result, the user of the display processing apparatus 100 is able to specify any of various display modes by changing the viewpoint used for rendering the position coordinate system. For example, the user is able to select a display mode as shown in FIG. 3.

Figure 3:
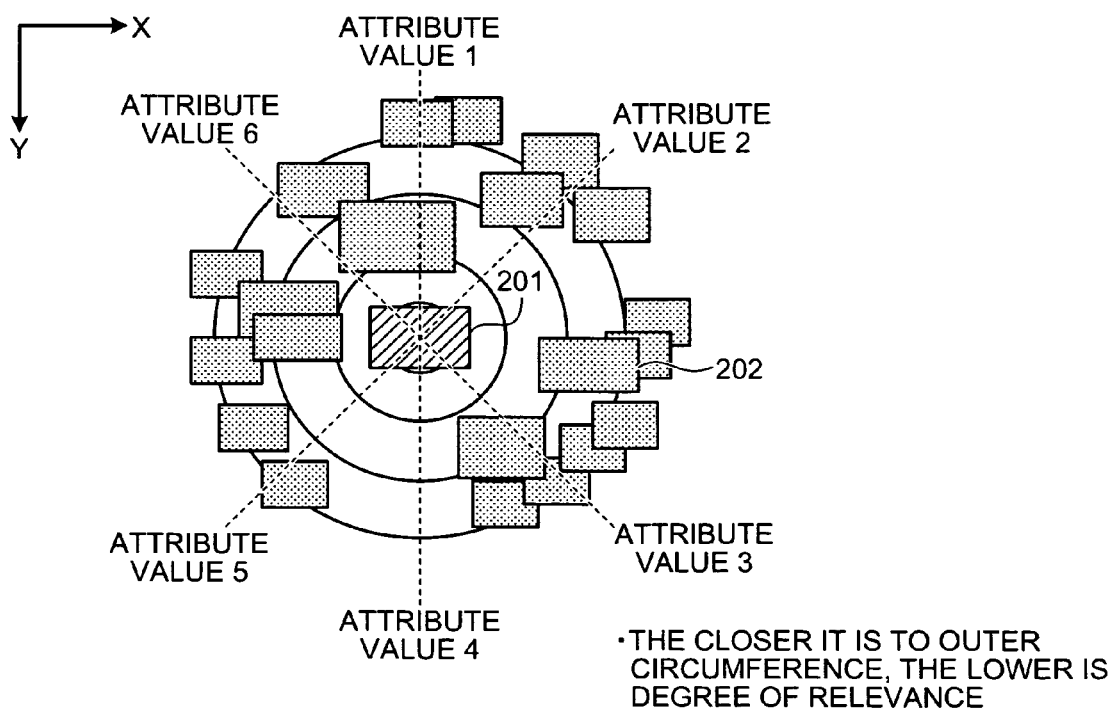
FIG. 3 is a conceptual drawing for explaining an X-Y axis coordinate plane in the position coordinate system in the form of a conical surface.

Further, as shown in FIG. 3, it is understood that an attribute value is assigned to each of axes on an X-Y axis plane in a display coordinate system. As explained here, the display processing apparatus 100 lays out and displays the pieces of content display data in the virtual three-dimensional space according to the attribute values of the contents. As a result, the user is able to understand what is in each of the contents. When the user has selected any one of the pieces of content display data, the display processing apparatus 100 performs a layout change animation.

Figure 4:
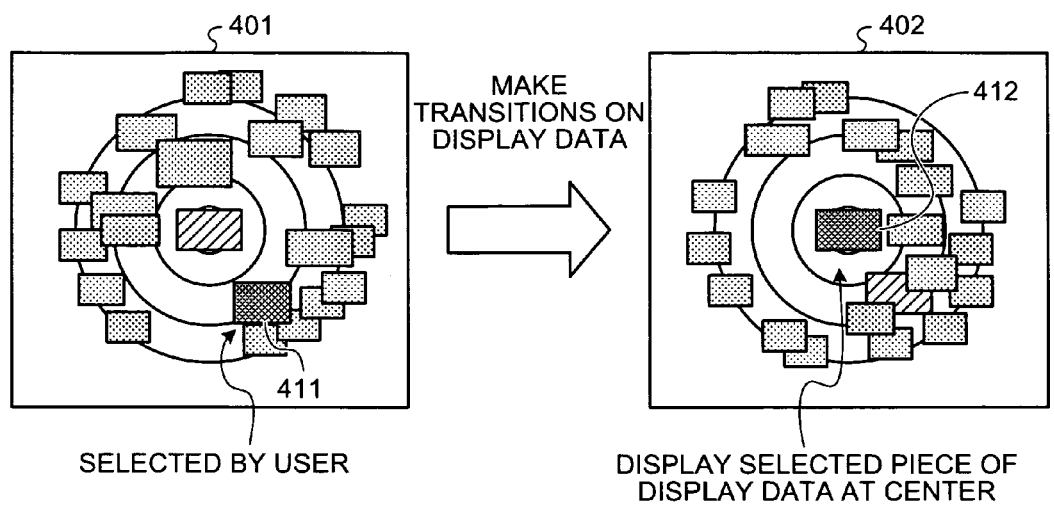
FIG. 4 is a conceptual drawing for explaining a comparison example of a layout change animation for pieces of display data.

First, a comparison example of a layout change animation with display data will be explained. An example will be explained in which, as shown in FIG. 4, the layout change animation with display data according to the comparison example is applied to a position coordinate system defined in the form of a conical surface. In this situation, a display processing apparatus according to the comparison example displays a plurality of pieces of content display data in a display area 401. Further, in the case where a user or the display processing apparatus has selected a piece of content display data 411 out of the pieces of content display data that are displayed, the conventional display processing apparatus first displays a layout change animation for the pieces of content display data and subsequently displays a piece of content display data 412, which has been selected, at the center, as shown in a display area 402, and also displays the other pieces of content display data in the surroundings of the piece of content display data 412.

Figure 5:
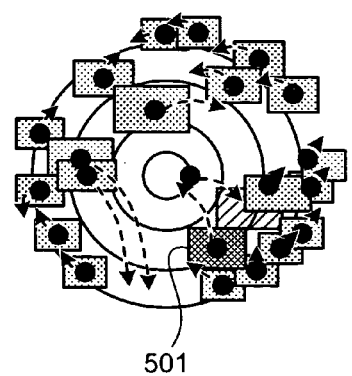
FIG. 5 is a drawing illustrating transition loci of the pieces of display data in the layout change animation according to the comparison example.

In this situation, the pieces of content display data go through transitions along transition loci as shown in FIG. 5. A piece of content display data 501, which has been selected, makes a transition to the center of the coordinate system, whereas the other pieces of content display data also make transitions while moving in various transition directions. In this manner, all the pieces of content display data make transition at once along the irregular transition loci. Thus, the transition loci of two or more of the pieces of content display data cross one another, and two or more of the pieces of content display data overlap one another. As a result, it is difficult for the user to recognize the transition process of the pieces of content display data. Also, in the case where the user has focused on an arbitrary one of the pieces of content display data, there is a possibility that he/she may lose track of the piece of content display data due to the layout change. In addition, because all the pieces of content display data are moved at once, the animation display is performed in the entire area of the display screen. This makes the animation display itself bothersome. In this type of animation display, it is desirable to make it easier for the user to understand the changes happening on the screen.

Figure 6:
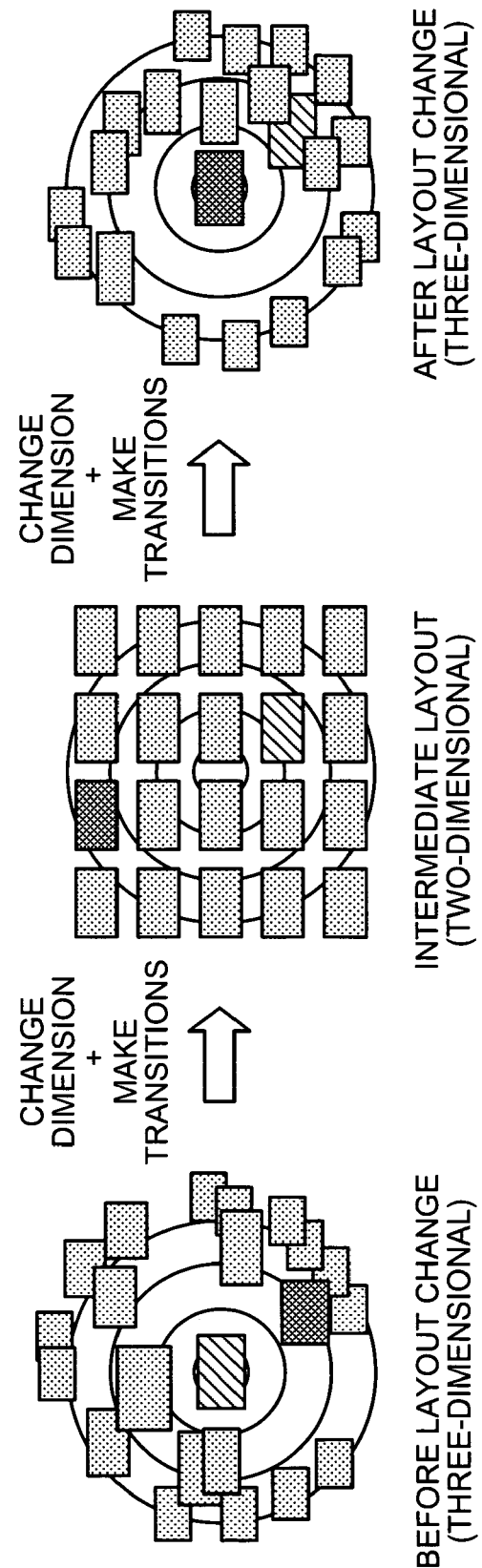
FIG. 6 is a conceptual drawing for explaining changes of virtual spaces and transitions of pieces of display data that are displayed by the display processing apparatus according to the first embodiment.

To cope with this situation, as shown in FIG. 6, the display processing apparatus 100 according to the first embodiment is configured so as to display an intermediate layout in which it is easy for the user to understand a list view of the pieces of content display data, before rearranging the layout of the pieces of content display data (hereinafter, "performing a rearranging process") while using a piece of content display data that has been selected according to an operation of the user as a reference. In other words, the rearranging process using the piece of content display data that has been selected as a reference is performed after the intermediate layout is displayed. As explained above, the position coordinate system used in a pre-layout-change layout and the position coordinate system used in a post-layout-change layout are both provided in the virtual three-dimensional space. In contrast, the intermediate layout is provided in a space of lower dimension, by 1 or more, than the virtual three-dimensional space (i.e., a two-dimensional space called a virtual plane is used according to the first embodiment).

According to the first embodiment, when the contents are organized into a rearranged layout based on an instruction from the user or the display processing apparatus 100, the pre-change layout of the display data, the post-change layout of the display data, and the intermediate layout of the display data (which is temporarily used before the transitions are made to organize the display data into the post-change layout) are defined as three types of transition states.

In other words, according to the first embodiment, after a state transition is made from the pre-change layout of the display data in the virtual three-dimensional space to the intermediate layout of the display data in the virtual two-dimensional space, another state transition is made from the intermediate layout of the display data in the virtual two-dimensional space to the post-change layout of the display data in the virtual three-dimensional space.

Figure 7:
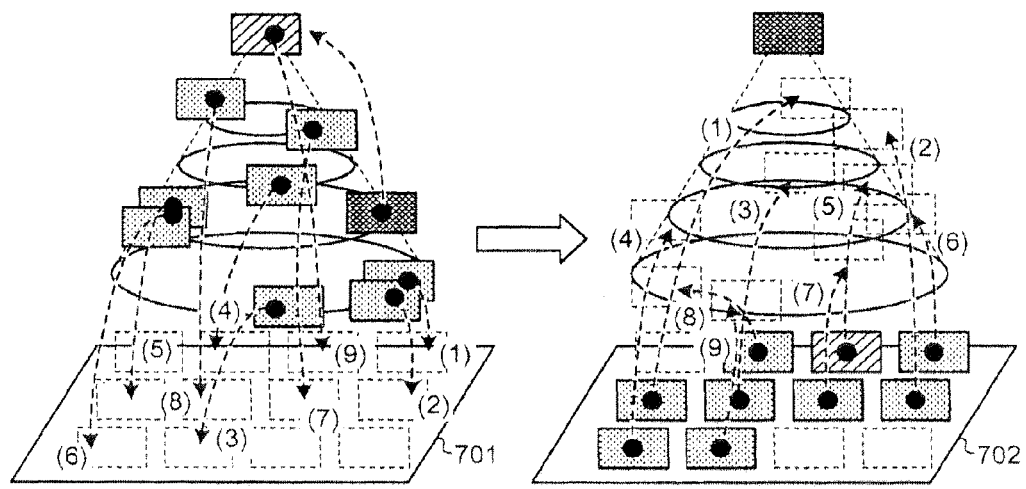
FIG. 7 is a drawing illustrating loci of the pieces of content display data that go through transitions in virtual spaces displayed by the display processing apparatus according to the first embodiment.

The transition loci of the pieces of content display data in the present example are shown in FIG. 7. As shown in FIG. 7, the transitions are made in a predetermined order on the pieces of content display data that have been laid out in the three-dimensional space so that the pieces of content display data are laid out into the two-dimensional space (i.e., a virtual plane 701). In addition, along with the transition and the laying out processes, the plane 701 is specified as a display area. Subsequently, transitions are made in a predetermined order on the pieces of content display data that have been laid out in the two-dimensional space (i.e., a plane 702) so that the pieces of content display data are laid out into the virtual three-dimensional space. In addition, along with the transition and the laying out processes, the virtual three-dimensional space is specified as a display area.

As explained above, the display processing apparatus 100 according to the first embodiment once aligns the pieces of content display data in the two-dimensional space so that the piece of content display data do not overlap one another, before making the transitions and laying out the pieces of content display data in the predetermined order. Thus, it is possible to avoid the situation in which the display becomes crowded.

In the layout change animation for the pieces of content display data according to the conventional method described above, even if the transitions are made on the pieces of content display data in the predetermined order within the one virtual three-dimensional space, there may be a situation where two or more of the pieces of content display data overlap one another during the transition process or where the transition destination of a piece of content display data still has another piece of content display data on which a transition process has not yet been performed. Thus, it is difficult to avoid the situation in which the display becomes crowded.

In other words, the display processing apparatus 100 according to the first embodiment temporarily aligns the pieces of content display data in the different virtual space, before organizing the pieces of content display data into the intended rearranged layout. Thus, by using the display processing apparatus 100 according to the first embodiment, it is possible to avoid the situation in which the display becomes crowded due to the transitions that are made on the pieces of content display data within the same space.

To temporarily align the pieces of content display data, by using the virtual space of lower dimension than the virtual space used in an intended layout of the pieces of content display data, it is possible to reduce the information amount during the data layout process. Thus, it is easy for the user to recognize each piece of data. As a result of this process, it is possible to realize an animation display with which it is easy for the user to recognize the layout changing process of the piece of content display data.

Figure 8:
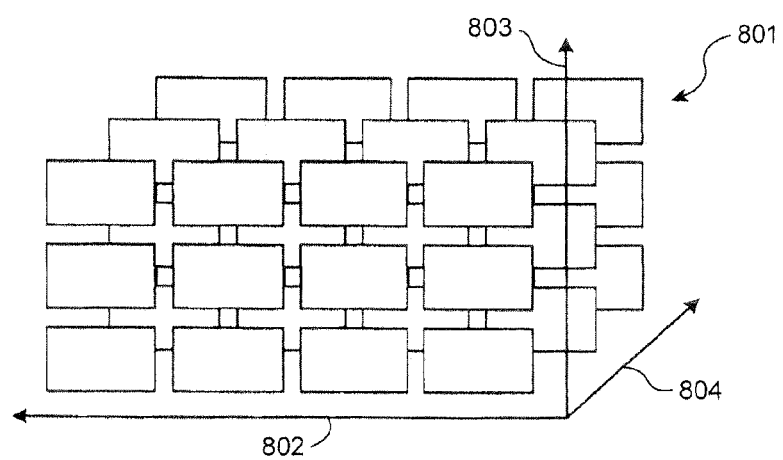
FIG. 8 is a drawing illustrating an example in which a three-dimensional grid is used in a virtual space in which display data is displayed by a display processing apparatus.
Figure 9:
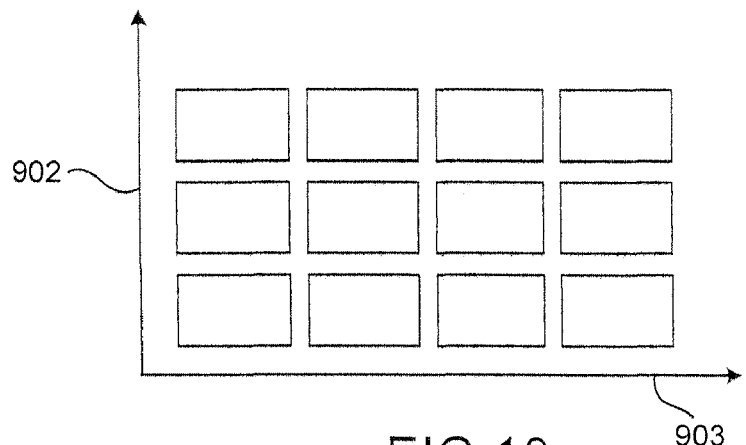
FIG. 9 is a drawing illustrating an example in which a two-dimensional grid is used in a virtual space in which display data is displayed by a display processing apparatus.

In the first embodiment, the virtual space in which the data is laid out is not limited to the coordinate system in the form of a conical surface as described above. For example, the display processing apparatus may display a virtual space 801, as shown in FIG. 8, in which pieces of layout target data (including content display data) that have been sorted according to arbitrary attributes are laid out in the form of a three-dimensional grid or a virtual space having axes 802, 803 and 804. As shown in FIG. 9, pieces of layout target data (including content display data) that have been sorted according to arbitrary attributes are laid out in the form of a two-dimensional grid having axes 902 and 903. The arbitrary attributes are respectively assigned to the axes of the two-dimensional or three-dimensional grid, so that each of the pieces of layout target data that have been sorted according to the attributes are assigned to a layout frame, and the layout positions of the pieces of layout target data are determined. Thus, when the attributes assigned to the axes have been changed or the like, a rearranging process will be performed.

In these examples, in the case where a three-dimensional grid is used, the pieces of layout target data are laid out on a virtual plane (i.e., a two-dimensional space) or on a virtual line (i.e., a one-dimensional space) in an intermediate layout. In the case where a two-dimensional grid is used, the pieces of layout target data are laid out on a virtual line (i.e., a one-dimensional space) in an intermediate layout.

Figure 10:
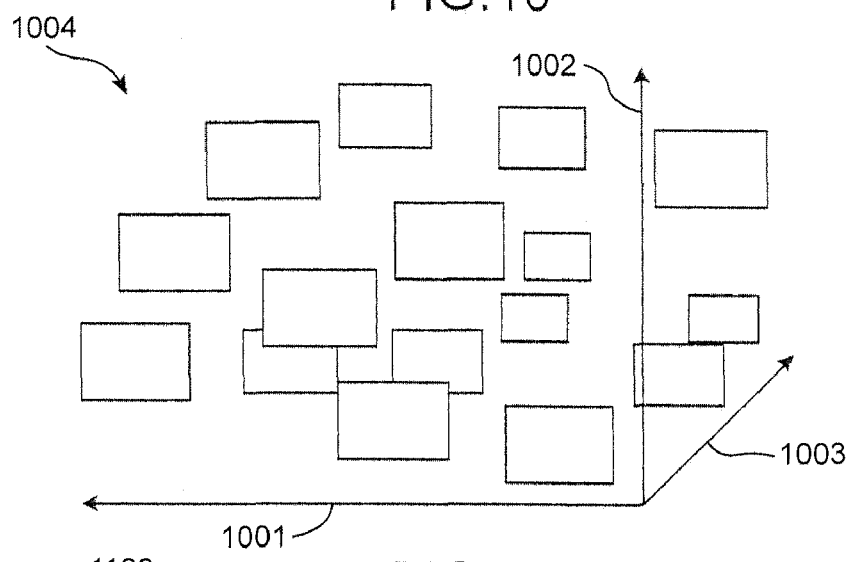
FIG. 10 is a drawing illustrating an example in which a virtual three-dimensional space is used as a virtual space in which display data is displayed by a display processing apparatus.
Figure 11:
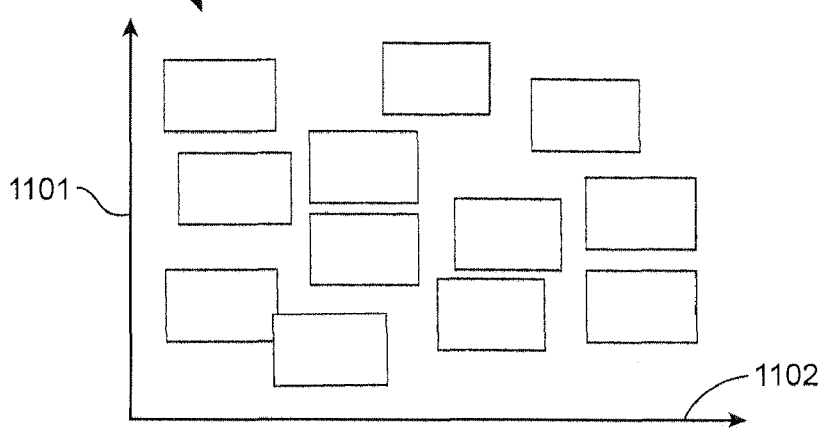
FIG. 11 is a drawing illustrating an example in which a virtual two-dimensional space is used as a virtual space in which display data is displayed by a display processing apparatus.

Further, as shown in FIGS. 10 and 11, the display processing apparatus may display the data by using layout spaces 1004 and 1103, respectively, having three-dimensional axes 1001, 1002 and 1003 (FIG. 10) or two-dimensional axes 1101 and 1102 (FIG. 11), without using layout frames arranged in the form of a grid. In this example, arbitrary attributes related to the data are respectively assigned to the axes, so that the pieces of layout target data are laid out based on the attribute values thereof. An arrangement is acceptable in which a minimum value and a maximum value are defined for each of the axes. In this situation, one or more pieces of layout target data each having an attribute value that falls between the minimum value and the maximum value are displayed. Like the example described above, when the attributes assigned to the axes have been changed or the like, a rearranging process will be performed. An intermediate layout is also used in the same manner as in the example described above. Thus, the explanation thereof will be omitted.

Returning to the description of FIG. 1, configurations of the display processing apparatus 100 will be explained. The content-attribute information storage unit 102 stores therein pieces of attribute information each of which is related to a different one of the contents (hereinafter, "content attribute information"), while keeping the pieces of content attribute information and the contents in correspondence with one another. Each of the pieces of content attribute information is information indicating properties that are unique to the corresponding content. Each of the pieces of content attribute information indicates, for example, the title of the content and/or the genre to which the subject matter of the picture belongs.

For example, in the case where one of the contents is a TV program, information (hereinafter, "program information") indicating, for example, the broadcast date/time and the TV channel of the TV program, the title of the TV program, a summary of the TV program, the genre to which the TV program belongs, a list of the performers, and information about the creators is provided in an electronic TV program listing such as an EPG. Thus, if such an EPG is available, the content-attribute information storage unit 102 stores therein the program information of each of the contents provided by the EPG as the content attribute information. Alternatively, another arrangement is acceptable in which the content-attribute information storage unit 102 stores therein thumbnail images showing the contents or the like as the content attribute information.

As shown in FIG. 12, the content-attribute information storage unit 102 stores therein data identifiers, broadcast stations, genres, and broadcast periods, while keeping them in correspondence with one another. Each of the data identifiers is information that identifies a corresponding one of the contents.

Another arrangement is acceptable in which the content attribute information being managed is information other than field information as described above. For example, the content attribute information may be meta data indicating the details of the picture. As specific examples, the content attribute information may indicate the recording date/time, the showing date/time, the creators, the performers, the genre, the length of the picture showing period, and a degree by which the content is recommended.

The recording date/time attribute is an attribute indicating the date and time at which the picture content was recorded. The showing date/time attribute is a broadcast date/time in the case where the picture content is a broadcast program and is identification information indicating blank in the case where the picture content is not a broadcast program. The creator attribute is information identifying the one or more creators of the picture content. The performer attribute is information identifying the one or more people performing in the picture content. An arrangement is acceptable in which, as an additional attribute regarding information about performing people, cast information indicating the role each person is performing in the picture content is provided.

The genre attribute indicates the genre to which the picture content belongs. The picture showing period length attribute indicates the length of a playback period of the picture content. A title attribute denotes the title of the picture content. The recommendation degree attribute is rank information that has been provided by a content provider or calculated by the display processing apparatus 100 or rank information that has been provided via a network. A viewing history attribute indicates how many times the picture content has been viewed so far. The different types of attribute information (i.e., the meta data) explained above are only examples. It is not necessary for the content attribute information to include all these attributes listed as examples. Conversely, it is acceptable for the content attribute information to include attributes other than these examples. Further, as for the format of the meta data, the meta data may be written by using a tagged text like an XML or may be written by using any other arbitrary format.

Returning to the description of FIG. 1, the pre-change layout storing unit 108 stores therein position information indicating the positions in which the pieces of content display data have already been laid out in the virtual three-dimensional space displayed on the display monitor 150. According to the first embodiment, the pre-change layout storing unit 108 stores therein the position coordinates on circular planes arranged along the virtual three-dimensional conical surface, as the position information in the virtual three-dimensional space.

In other words, the pre-change layout storing unit 108 stores therein the position information of the piece of content display data corresponding to a time before the rearranging process is performed (hereinafter, the "pre-rearrangement layout"). An arrangement is acceptable in which the display processing apparatus 100 initializes the information stored in the pre-change layout storing unit 108 when the first layout changing process is performed. Another arrangement is acceptable in which the display processing apparatus 100 generates position information for each of the pieces of content display data based on arbitrary initial-layout information and writes the generated position information into the pre-change layout storing unit 108. As for the method for generating the initial-layout information, it is acceptable to generate the initial-layout information by, for example, assigning an arbitrary attribute to each of the axes and specifying a layout of the pieces of content display data according to the assigned attributes. Alternatively, it is acceptable to generate the initial-layout information by laying out an arbitrary number of pieces of content display data in a random manner in a virtual three-dimensional space.

The input controlling unit 103 controls input information indicating operations performed by the user. For example, the input controlling unit 103 exercises control so as to receive, while the pieces of content display data are being displayed in a list view, a selection of an arbitrary one of the pieces of content display data.

The selecting unit 104 selects the piece of content display data that has been received as a selection by the input controlling unit 103, as a piece of content display data used as a reference in the rearranging process.

The intermediate-layout template storage unit 105 stores therein template information used in the intermediate layout. According to the first embodiment, a (first) template defining slots used for laying out the pieces of content display data is used as the template information. However, the definition of the template information is not limited to this example.

The intermediate-layout template storage unit 105 according to the first embodiment stores therein two tables. These two tables will be referred to as a first template management table and a second template management table.

The first template management table is a template used for specifying the positions to which the pieces of content display data are assigned on a virtual plane. As shown in FIG. 13, the first template management table stores therein slot numbers, positions, sizes, corresponding axis numbers, and axis order numbers, while keeping them in correspondence with one another.

The slots denote frames into each of which a piece of content display data is to be laid out. For each of the slots, information related to the position of the data, e.g., the position coordinates and the size (i.e., the display size) of the corresponding piece of content display data is stored. Further, with each of the slots, information that is necessary to assign a piece of content display data to the slot, as well as a corresponding axis number and an axis order number are kept in correspondence.

In the example shown in FIG. 13, there are twelve slots. Thus, it is possible to specify a layout of twelve pieces of content display data on the virtual plane. In addition, it is possible to specify the layout and the size of each of the slots with the information shown in the "position" column and the "size" column. The corresponding axis numbers are serial numbers that identify axes to which the slots belong. The axis order numbers indicate an order in which the slots are assigned to the corresponding axes thereof.

The second template management table is a template storing therein information about the attributes to be assigned to the axes, so that each of the contents can be assigned to one of the slots. As shown in FIG. 14, the second template management table stores therein corresponding data attributes and alignment rules, while keeping them in correspondence with one another. Stored in the "corresponding data attributes" column are attributes to be assigned to the axes each of which is identified by an axis number and one or more attribute values of each of the attributes (i.e., one or both of a starting value and an ending value).

Further, the second template managing table stores therein, as the alignment rules for the contents each of which has been assigned to a corresponding one of the axes, attributes and layout order (i.e., ascending order or descending order) used for laying out the contents according to the axis order numbers.

More specifically, in the case where the second template management table stores therein the information shown in FIG. 14, "a broadcast station attribute: Channel 1" is assigned to Axis 1; "a broadcast station attribute: Channel 2" is assigned to Axis 2; "a broadcast station attribute: Channel 3" is assigned to Axis 3; and "a broadcast station attribute: Channel 4" is assigned to Axis 4. Further, an alignment rule "in ascending order of the values each showing the broadcast starting time" is stored for each of the axes. In the case where the alignment rule "in ascending order of the values each showing the broadcast starting time" is stored, the pieces of content display data are aligned along each of the axis by using the broadcast starting times thereof.

With this arrangement in which the first template management table and the second template management table store therein the information described above, the intermediate layout specifying unit 106 is able to specify the contents to be assigned to each of the axes and the order in which the contents should be laid out on the virtual plane, which is the two-dimensional space.

Returning to the description of FIG. 1, for each of the pieces of content display data, the intermediate layout specifying unit 106 reads the position information out of the pre-change layout storing unit 108 and specifies position information that is used after the read position information for temporarily laying out the pieces of content display data during a transition process. The specified position information is position information in a virtual space of lower dimension, by 1 or more, than the virtual three-dimensional space described above. According to the first embodiment, the specified position information is position information on the virtual plane, which is the two-dimensional space. In this manner, the intermediate layout specifying unit 106 specifies the position information in the coordinate system on the virtual plane that is used before the intended rearranging process is performed.

In the case where the display area for the layout before the rearranging process is performed (i.e., the pre-rearrangement layout) and for the layout after the rearranging process is performed (hereinafter, the "post-rearrangement layout) is a virtual three-dimensional space, the virtual space in which the pieces of content display data are temporarily laid out during the rearranging process is one selected out of: a plane; a straight line; and a point. For example, in the case where the rearranging process is performed based on the attributes so that the pieces of content display data are laid out on a virtual plane such as a table or a chart, it is easy for the user to understand the attributes of the contents by visually observing the display. Alternatively, in the case where the rearranging process is performed based on attributes (e.g., attributes along a time line) so that the pieces of content display data are laid out on a virtual straight line, it is even easier for the user to understand the attributes of the data than when a plane is used, although the amount of information the user is able to observe at a time is smaller. In the case where a point is used, the user is not able to understand the data based on the attributes thereof because the rearranged display is not related to the attributes of the pieces of content display data; however, it is easy for the user to visually observe the transition process because the transition destinations of the pieces of content display data are clearer.

Examples of methods for specifying the intermediate layout include: a method by which information used for laying out the pieces of content display data in a virtual space of lower dimension than the virtual space used in the pre-rearrangement layout and in the post-rearrangement layout is stored in advance, so that the position information indicating the positions into which the pieces of content display data are to be laid out is specified based on the stored information; and a method by which the position information in the virtual space of lower dimension than the virtual space used in the pre-rearrangement layout and in the post-rearrangement layout is specified based on the position information corresponding to the pre-rearrangement layout and the position information corresponding to the post-rearrangement layout.

In the first embodiment, an example using the former method will be explained in which the information used for laying out the pieces of content display data in the virtual space of lower dimension than the virtual space used in the pre-rearrangement layout and in the post-rearrangement layout is stored in advance (i.e., stored in the intermediate-layout template storage unit 105), so that the position information indicating the positions into which the pieces of content display data are to be laid out is specified based on the stored information. When this method is used, the intermediate layout specifying unit 106 specifies the position information of each of the pieces of content display data according to the template information stored in the intermediate-layout template storage unit 105 for the purpose of laying out the pieces of content display data.

In other words, the intermediate layout specifying unit 106 specifies the positions into which the pieces of content display data are to be laid out, respectively, by referring to the first template management table and the second template management table that are stored in the intermediate-layout template storage unit 105. For example, the intermediate layout specifying unit 106 specifies an attribute value and an alignment rule (including an attribute and the order) assigned to the axis of each of the slots, according to the correspondence relationship based on the axis number.

In the first embodiment, an attribute (i.e., Channel n) is assigned to each of the axes. However, it is also acceptable to assign another attribute value to each of the axes. For example, it is acceptable to assign a genre attribute to each of the axes. In this situation, for example, "a genre attribute: drama" is assigned to Axis 1, whereas "a genre attribute: sports" is assigned to Axis 2.

In the case where the attributes assigned to the axes are expressed with serial values such as broadcast starting times, it is a good idea to designate a range of attribute values to be assigned to each of the axes. For example, a range from 19:00 hours on Oct. 10, 2008 (i.e., Oct. 1, 2008) to 20:00 hours on Oct. 10, 2008 is designated for Axis 1, so that one or more pieces of content display data representing broadcast programs starting at any time during this period are assigned to Axis 1.

Further, in the case where the second template management table shows, as the alignment rule, "broadcast starting time" as the attribute and "ascending order" as the order, the intermediate layout specifying unit 106 specifies the positions of the pieces of content display data by sequentially assigning the pieces of content display data to the slots, respectively, starting with the content having the earliest broadcast starting time, followed by the other contents arranged in ascending order of broadcast starting time.

As another example, in the case where the pieces of content display data are aligned according to the attribute values thereof showing specific values that are non-serial numbers (e.g., broadcast station channel numbers), the intermediate layout specifying unit 106 aligns the pieces of content display data based on the non-serial attribute values, by designating "broadcast station" as the "attribute" in the alignment rule and designating specific attribute values such as "Channel 1→Channel 3→Channel 4→Channel 6 . . . " as the "order" in the alignment rule.

In this manner, it is possible to assign an attribute to each of the axes. However, it is also acceptable to align the pieces of content display data by using the attribute values of the assigned attribute, instead of using the other attributes and the attributes values thereof as the alignment rule as explained above.

According to the first embodiment, the first template management table and the second template management table are managed separately so that the positions of the slots are stored separately from the attributes used for assigning the slots to the corresponding axes respectively. With this arrangement, it is possible to eliminate, from the first template management table, description of the attribute information that is dependent on the pieces of content display data. As a result, it is possible to improve reusability of the templates.

If the first template management table and the second template management table were collectively managed in one table, in the case where an attribute of the data was written without using the corresponding axis numbers, it would be necessary to edit the template information to lay out a group of pieces data that does not have the attribute. Thus, reusability of the template would be lower. Similarly, if the alignment rule of the data was directly written in the template without using the corresponding axis order numbers, it would be necessary to edit the template to change the layout order. In contrast, according to the first embodiment, the attributes of the data are eliminated, so that one of the templates is written based on abstract concepts. Thus, even if the attributes of the data have been changed, it is not necessary to change the first template, and thus, reusability is improved. Because the plurality of separate tables based on the concepts are used, editing and managing the information is easier.

According to the first embodiment, the position information in the coordinate system on the virtual plane is specified; however, any other arrangements are acceptable as long as a virtual space of lower dimension, by 1 or more, than the virtual space displayed before the transition is made is used. For example, it is acceptable to specify position information in a virtual one-dimensional space (i.e., a line). Examples of information that can be assigned to an axis in a virtual one-dimensional space (i.e., a line) include a temporal axis (i.e., a time line) and degrees by which each of the content is recommended.

The intermediate layout storing unit 109 stores therein the position information of the pieces of content display data that has been specified by the intermediate layout specifying unit 106.

The intermediate layout storing unit 109 stores therein, layout information numbers each of which is a unique number, data identifiers each of which identifies a different one of the pieces of content display data that have been registered as the layout targets, and the position information of the pieces of content display data, while keeping them in correspondence with one another. With this arrangement, it is possible to extract position information that corresponds to each of the pieces of content display data. Each of the data identifiers may be a value that is unique to the data or may be a pointer that specifies an area in which the data is stored. The position information is a two-dimensional vector value when a two-dimensional space is used and is a scalar value when a one-dimensional space is used.

As shown in FIG. 15, the intermediate layout storing unit 109 stores therein data identifiers, broadcast stations, genres, broadcast periods, positions, and sizes, while keeping them in correspondence with one another. In the table as shown in FIG. 15, pieces of information about the contents are stored in ascending order, for each of the axes to which the attributes are assigned. As a result, the first transition calculator 110 and the second transition calculator 111 are able to obtain the layout (i.e., the position information) of the pieces of content display data in the intermediate layout, by requesting the information from the intermediate layout storing unit 109.

Figure 16:
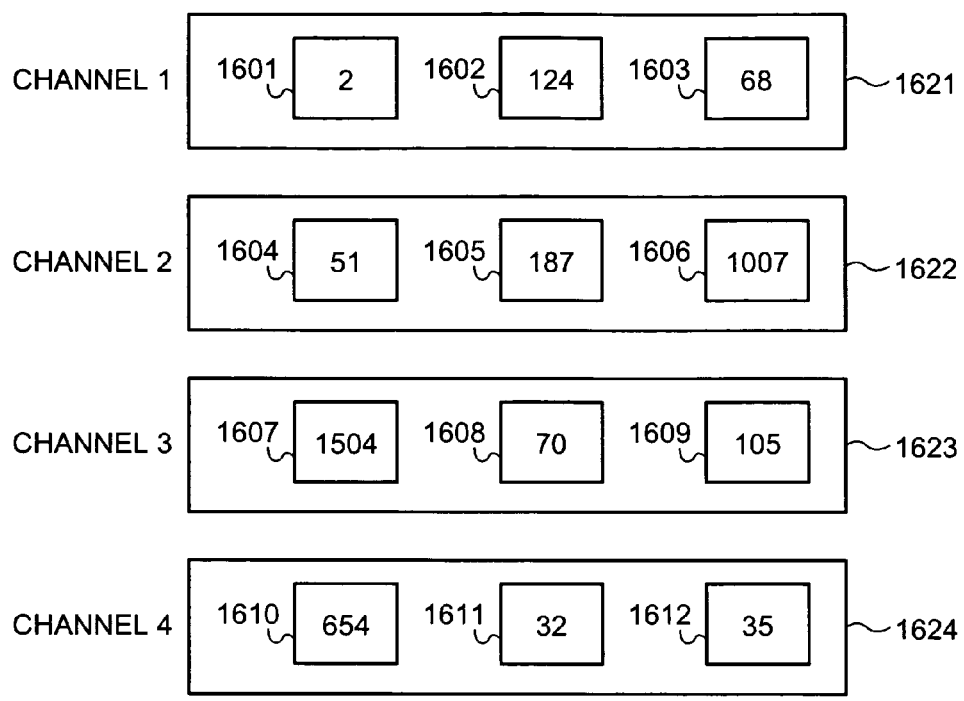
FIG. 16 is a drawing illustrating an example of screen information displayed in an intermediate layout by a display controlling unit according to the first embodiment.

Further, when the display controlling unit 115 has displayed a screen showing the intermediate layout according to the information stored in the intermediate layout storing unit 109 as shown in FIG. 15, screen information as shown in FIG. 16 will be displayed. As explained here, because the intermediate layout storing unit 109 stores therein the information as shown in FIG. 15, the position information of the pieces of content display data and the size in which each of the pieces of content display data is displayed in the intermediate layout can be specified.

In the example shown in FIG. 16, pieces of content display data 1601, 1602, and 1603 are displayed in an area 1621 corresponding to Channel 1, whereas pieces of content display data 1604, 1605, and 1606 are displayed in an area 1622 corresponding to Channel 2, while pieces of content display data 1607, 1608, and 1609 are displayed in an area 1623 corresponding to Channel 3, and pieces of content display data 1610, 1611, and 1612 are displayed in an area 1624 corresponding to Channel 4.

Returning to the description of FIG. 1, the post-change layout specifying unit 107 specifies the position information of the pieces of content display data to be organized into the rearranged layout in the virtual three-dimensional space, based on the piece of content display data that has been selected by the selecting unit 104. The rearranging process is performed according to an instruction for a layout change to be made on the pieces of content display data, the instruction having been issued by a user or the display processing apparatus 100. Further, when such an instruction has been issued, the post-change layout specifying unit 107 reads the attribute information of the contents from the content-attribute information storage unit 102 and specifies the position information of the pieces of content display data of the contents, based on the attribute information of the contents.

According to the first embodiment, the post-change layout specifying unit 107 specifies position information corresponding to the center of the position coordinate system, as the position information of the piece of content display data representing the content that has been selected by the selecting unit 104. After that, the post-change layout specifying unit 107 specifies position information of the pieces of content display data indicating the other contents, by using the selected content as a reference. More specifically, for each of the other contents, the post-change layout specifying unit 107 calculates a degree of relevance between the attribute information of the content and the attribute information of the selected content and specifies the position information within the position coordinate system according to the calculated degree of relevance. To calculate the degree of relevance, it is acceptable to use any methods including the methods that are known.

Figure 2:
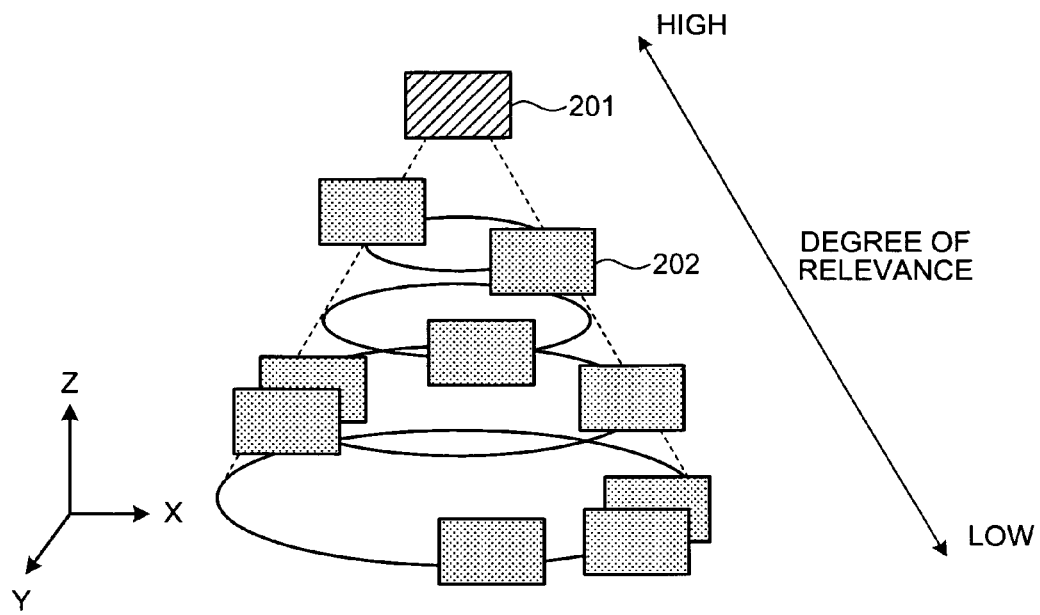
FIG. 2 is a conceptual drawing for explaining a position coordinate system in the form of a conical surface.

As a result, as shown in FIG. 2, it is possible to lay out the pieces of content display data so that the piece of content display data 201 that has been selected is laid out at the apex of the coordinate system in the form of a conical surface, while the other pieces of content display data are laid out in such a manner that the higher the degree of relevance of a content to the piece of data laid out at the apex (hereinafter, the "focused content") is, the closer the piece of content display data of the content is positioned in the display.

As for the method for calculating the degree of relevance, the attribute information of two contents (i.e., the focused content and another content) is compared, so that a numerical value showing how much the contents are relevant to each other can be calculated. As an example of a method for calculating a degree of relevance for picture contents, it is acceptable to use a method by which a degree of matching is calculated individually for each of the attributes such as the genre, the performers, and the broadcast date/time, so that a sum of the degrees of matching can be calculated.

In the case where a predetermined number of contents are to be displayed in the coordinate system described above, to determine the contents that are the display targets, it is acceptable to use a method by which a threshold value for the degrees of relevance is specified in advance, so that the degree of relevance calculated for each of the contents is equal to or higher than the specified threshold value, the content is determined as a layout target. As explained here, every time a rearranging process is performed, some contents stop being display targets, while other contents become display targets. The method for making transitions on these pieces of content display data will be explained later.

The instruction indicating that the rearranging process should be performed is based on the designation of an arbitrary focused content. In other words, when the focused content data has been changed, it becomes necessary to re-calculate the degrees of relevance and to change the layout.

The method for laying out the data explained above is only an example. It is acceptable to use any other rearranging methods including the methods that are known.

The post-change layout storing unit 116 stores therein the position information of the pieces of content display data corresponding to the post-rearrangement layout that has been specified by the post-change layout specifying unit 107.

The post-change layout storing unit 116 stores therein, layout information numbers each of which is a unique number, data identifiers each of which identifies a different one of the pieces of content display data that have been registered as the layout targets, and the position information of the pieces of content display data, while keeping them in correspondence with one another. With this arrangement, it is possible to extract position information that corresponds to each of the pieces of content display data. Each of the data identifiers may be a value that is unique to the data or may be a pointer that specifies an area in which the data is stored. The position information is a three-dimensional vector value, when the virtual space area into which the data is to be laid out is a three dimensional space. Alternatively, the position information is a two-dimensional vector value when the virtual space area is a two-dimensional space, whereas the position information is a scalar value when the virtual space area is a one-dimensional area.

In correspondence with the change of the display area from the position coordinate system to the other coordinate system on the virtual plane of lower dimension, by 1 or more, than the position coordinate system, the first transition calculator 110 calculates, for each of the pieces of content display data, a first transition path from a position indicated by the position information read from the pre-change layout storing unit 108 to a position indicated by the position information read from the intermediate layout storing unit 109.

Further, the first transition calculator 110 specifies the order in which transitions are made on the pieces of content display data from the pre-change layout to the intermediate layout, based on the transition paths of the pieces of content display data.

According to the first embodiment, to specify the order, a method is used by which a calculation is performed based on the distances between the position information of the pieces of content display data corresponding to the pre-change layout and the position information of the pieces of content display data corresponding to the intermediate layout.

Figure 17:
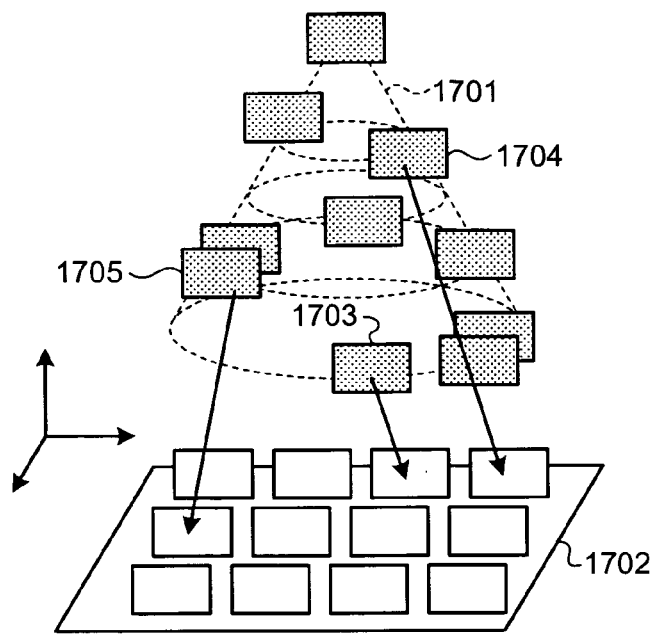
FIG. 17 is a conceptual drawing for explaining transitions of pieces of content display data that are made in a transition order based on transition distances.

As shown in FIG. 17, the length between the position indicated by the position information within a virtual three-dimensional space 1701 corresponding to the pre-change layout and the position indicated by the position information within a virtual two-dimensional space 1702 corresponding to the intermediate layout is calculated as a distance of the transition path.

The first transition calculator 110 calculates the distance of the transition path of each of the pieces of content display data that are the layout targets and specifies the order of transitions so that the transitions are sequentially made starting with the piece of content display data having the shortest distance of transition path, followed by the other pieces of content display data arranged in ascending order of distance. For example, among pieces of display data 1703, 1704, and 1705, the transitions are made in the following order: the display data 1703, the display data 1705, and display data 1704.

As explained above, the transitions are sequentially made, starting with the piece of content display data having the shortest distance, followed by the other pieces of content display data arranged in ascending order of distance. Thus, it is easy for the user to anticipate the transition order of the pieces of content display data. As a result, it is easy for the user to anticipate when a transition is to be made on the piece of content display data on which the user's focus is placed. Consequently, it is easy for the user to visually keep track of the piece of content display data.

In the case where the transitions are sequentially made, starting with the piece of content display data having the longest distance, followed by the other pieces of content display data arranged in descending order of distance, although it is easy for the user to anticipate the transition order of the pieces of content display data, some of the pieces of content display data may be hidden behind other pieces of content display data for which the transitions have not yet been started, and some of the pieces of content display data may overlap one another, during the transitions of the content display data. As a result, there is a possibility that the display may become crowded or that the user may be inhibited from visually keeping track of the content display data.

In contrast, in the case where the transitions are sequentially made starting with the piece of content display data having the shortest distance, followed by the other pieces of content display data arranged in ascending order of distance, when a piece of content display data having a longer distance in terms of the transition distance on the transition path starts being moved, the other pieces of content display data that were positioned on the transition path have already started being moved. As a result, the pieces of content display data do not come into contact with each other. Consequently, by specifying the order of transitions so that the transitions are made starting with the piece of content display data having the shortest distance of transition path, followed by the other pieces of content display data arranged in ascending order of distance, it is possible to make the transitions that make it easy for the user to visually keep track of the piece of content display data on which the user's focus is placed.

Figure 18:
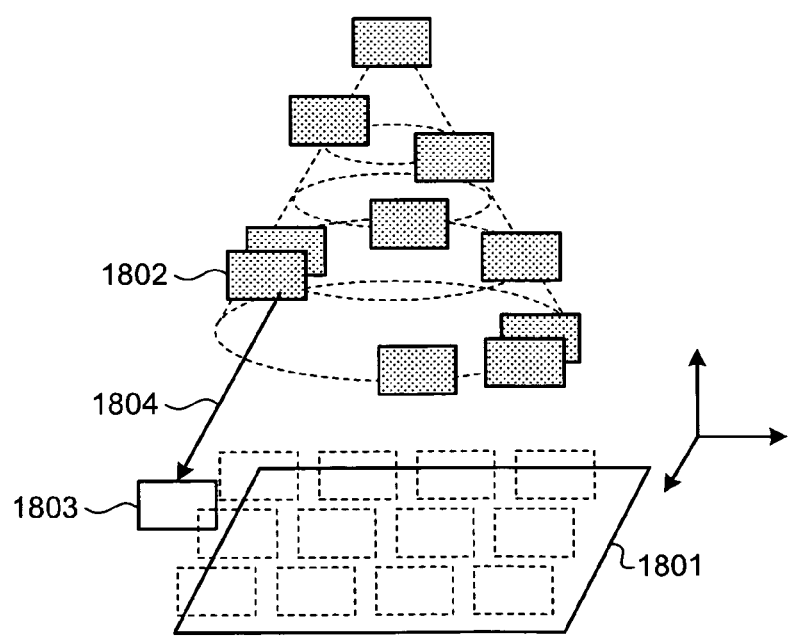
FIG. 18 is a conceptual drawing for explaining a transition of a piece of content display data that is no longer a display target in an intermediate layout.

As mentioned above, some of the pieces of content display data that were displayed in the three-dimensional space in the pre-change layout are no longer display targets when the rearranging process is performed. Let us assume that a piece of content display data 1802 shown in FIG. 18 is such a piece of content display data that is no longer a display target. In this situation, let us assume that the intermediate layout specifying unit 106 has specified position information 1803 indicating a position on the outside of a display area 1801 displayed on the display monitor 150, as the position information of the piece of content display data 1802 on the virtual plane corresponding to the intermediate-layout. Further, the first transition calculator 110 calculates a transition path to a position indicated by position information 1803 and a distance on the transition path.

Subsequently, in the case where the pre-change layout is in a virtual three-dimensional space, the first transition calculator 110 calculates the shortest distance to the position indicated by position information 1803 on the outside of the display area 1801 as the distance described above. Also, another arrangement is acceptable in which, instead of calculating the distance described above, the first transition calculator 110 specifies a moving direction of the piece of the content display data according to the data alignment rule for the intermediate layout and specifies a distance to a point at which, during the move along the specified moving direction, an area displayed as an intermediate layout area intersects the moving path, as the distance on the transition path.

For example, in the case where the pre-change layout is in a virtual three-dimensional space, whereas an area used in the intermediate layout is a virtual plane or a virtual line segment for which a display target area is specified in advance, it is possible to obtain the position coordinates at which the virtual plane or the virtual line segment intersects the moving direction of the piece of content display data, by extending the virtual plane to an infinite plane or by extending the virtual line segment to a straight line. By calculating the distance to the obtained position coordinates, it is possible to realize a display in which the piece of content display data that is no longer a display target goes through such a transition by which the piece of content display data is moved to the outside of the display area corresponding to the intermediate layout.

On the other hand, for a piece of content display data that was not a display target in the pre-rearrangement layout but becomes a display target in the intermediate layout and thereafter, it is necessary to specify a maximum value or a minimum value for the distance on the transition path, so that it is possible to specify the order in which the pieces of content display data are moved. In the case where a maximum value of the distance has been specified, it is possible to configure the display so that the piece of content display data that was not displayed in the pre-rearrangement layout appears, after all the pieces of content display data that have been displayed since before the rearranging process have gone through the transitions. In the case where a minimum value of the distance has been specified, it is possible to configure the display so that the piece of content display data that was not displayed in the pre-rearrangement layout appears, before all the pieces of content display data that have been displayed since before the rearranging process go through the transitions.

As for the method for specifying the order in which transitions are made on the pieces of content display data, apart from the first embodiment, another method may be used by which a calculation is performed based on the direction of a line obtained by, for each of the pieces of content display data, connecting a position indicated by the position information corresponding to the pre-change layout to a position indicated by the position information corresponding to the intermediate layout, instead of the method described above that is based on the distance on the transition path of each of the pieces of content display data. Next, a method for specifying the transition order by using this method will be explained as a modification example.

Figures 19, 20:
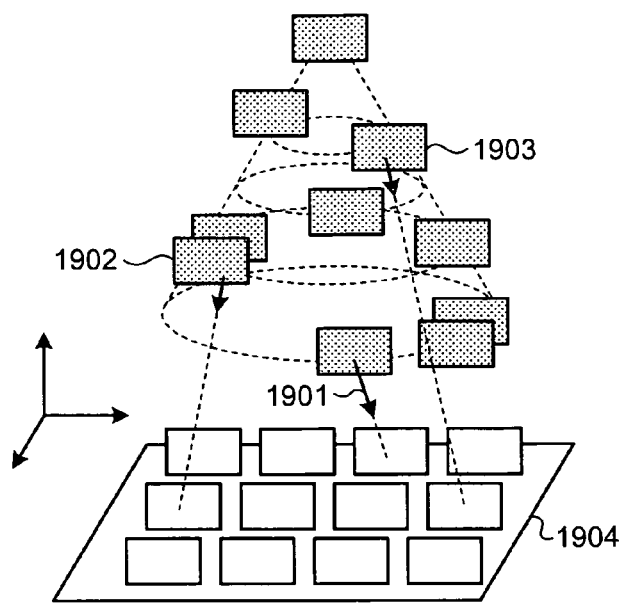
FIG. 19 is a conceptual drawing for explaining transitions of pieces of content display data that are made in a transition order based on transition directions.
FIG. 20 is a drawing for explaining a table structure of transition information output by a first transition calculator.

As shown in FIG. 19, according to this method, the first transition calculator 110 calculates, as a transition direction, a unit vector 1901 indicating the direction of the move from a position of a piece of data corresponding to the pre-change layout to a position of the piece of data corresponding to the intermediate layout. Such a transition direction is calculated for each of all the pieces of content display data that are the targets of the rearranging process. The transition order of the pieces of content display data is specified in such a manner that the closer the transition direction is to the transition direction of the piece of content display data on which the transition is made first, the earlier a transition is made on each of the other pieces of content display data.

As for the method for determining whether the transition direction is close, the first transition calculator 110 calculates an inner product of the transition direction of the piece of content display data on which a transition is made first and each of the transition directions of all the other pieces of content display data, so that the piece of content display data having the largest inner-product value is specified as the piece of content display data on which a transition is to be made next. In other words, in the case where the intermediate layout is a layout based on the attributes, if the transitions are made starting with the piece of content display data having the closest transition direction, the transitions are made starting with the piece of content display data having the closest attribute. Thus, it is easy for the user to understand what is in each of the pieces of content display data.

When this method is used, it is necessary to somehow determine the piece of content display data on which the transition is made first. To determine the piece of content display data on which the transition is made first, for example, it is acceptable to designate such a piece of content display data based on an operation performed by the user on an input device or to select a piece of content display data having a transition direction that is the closest to a predetermined transition direction as the piece of content display data on which the transition is made first.

Further, by using the method described above, it is possible to make the transitions on the pieces of content display data, starting with the piece of content display data having the closest transition direction, followed by the other pieces of content display data arranged in descending order of closeness. With this arrangement, some of the pieces of content display data of which the transition order numbers are close to each other do not have very different moving directions from one another. As a result, it is easy for the user to anticipate the transition process performed on the pieces of content display data. Consequently, it is relatively easier for the user to keep track of the transition of the piece of content display data on which the user's focus is placed.

As for the transition direction of a piece of content display data that was a display target in the pre-rearrangement layout but is no longer a display target in the intermediate layout and thereafter and the transition direction of a piece of content display data that was not a display target in the pre-rearrangement layout but has become a display target in the intermediate layout and thereafter, it is possible to calculate such transition directions by presuming position information of the piece of content display data that is no longer a display target, in a manner similar to the one described above where the transition order is calculated by using the distances of the transition paths. In the manner explained above, the transition order has been specified. In the following sections, the explanation of the first embodiment is continued.

According to the first embodiment, the first transition calculator 110 outputs the transition paths and the transition order that have been calculated in the form of a table as shown in FIG. 20. As shown in FIG. 20, the table shows transition order numbers, data identifiers, pre-transition positions, and post-transition positions, while keeping them in correspondence with one another. The transition order numbers indicate the order in which the transitions are to be made on the pieces of content display data. Each of the data identifiers is information that identifies a different one of the contents or a different one of the pieces of content display data. Each of the pre-transition positions indicates the position of the corresponding piece of content display data at the time when the transition is started. Each of the post-transition positions indicates the position of the corresponding piece of content display data at the time when the transition is completed.

In the description of the first embodiment, each of the transition paths calculated by the first transition calculator 110 is a straight-line path connecting the position indicated by the position information corresponding to the pre-rearrangement layout to the position indicated by the position information corresponding to the intermediate layout. However, it is acceptable to configure the first transition calculator 110 to calculate any other types of path. Similarly, the second transition calculator 111 explained below also calculates a straight-line path that connects the position indicated by the position information corresponding to the intermediate layout to the position indicated by the position information corresponding to the post-rearrangement layout. The transition paths and the transition order information that are shown in FIG. 20 are only examples. It is acceptable to configure the table to store therein any other attributes. Further, another arrangement is acceptable in which the information is written by using a data format such as XML, instead of the table format.

In correspondence with the change of the display areas from the coordinate system on the virtual plane to the position coordinate system in the form of the conical surface, the second transition calculator 111 calculates second transition paths from the positions indicated by the position information on the virtual plane that has been read from the intermediate layout storing unit 109 to the positions indicated by the position information in the position coordinate system in the form of the conical surface.

Further, the second transition calculator 111 specifies the order in which transitions are made on the pieces of content display data, based on the transition paths of the pieces of content display data. As for the method for specifying the order, the second transition calculator 111 may use the method based on the distances on the transition paths or the method based on the transition directions, like the first transition calculator 110.

When the second transition calculator 111 uses the method based on the distances on the transition paths, the second transition calculator 111 uses the distance from a position indicated by the position coordinates corresponding to the intermediate layout to a position indicated by the position coordinates corresponding to the post-rearrangement layout, instead of the distance, which is calculated by the first transition calculator 110, from a position indicated by the position coordinates corresponding to the pre-rearrangement layout to a position indicated by the position coordinates corresponding to the intermediate layout.

Further, the second transition calculator 111 calculates a transition distance for each of all the pieces of content display data that are the target of the rearranging process. After that, contrary to the first transition calculator 110, the second transition calculator 111 specifies the order of transitions so that the transitions are sequentially made, starting with the piece of content display data having the longest distance, followed by the other pieces of content display data arranged in descending order of distance. When the pieces of content display data are sequentially moved, starting with the piece of content display data having the longest distance, it is easy for the user to anticipate the transition process. Consequently, it is relatively easy for the user keep track of the transitions of the piece of content display data on which the user's focus is placed.

If the pieces of content display data were sequentially moved, starting with the piece of content display data having the shortest distance, followed by the other pieces of content display data arranged in ascending order of distance, although it would still be easy for the user to anticipate the transition, there would be a high possibility that, when a transition was made on a piece of content display data having a longer distance, some or all of the other pieces of content display data on which the transitions had already been completed may have already been laid out. Thus, because some of the pieces of content display data would come into contact with one another, the display might be crowded, and the user might be inhibited from visually keeping track of the transitions in the move of the content display data. In contrast, when the transitions are sequentially made starting with the piece of content display data having the longest distance, followed by the other pieces of content display data arranged in descending order of distance, a transition is started on the piece of content display data having a longer moving distance, before the rearranging process is started on some pieces of data having a possibility of being in contact with the data having the longer distance during the transition process. Thus, the pieces of content display data do not come into contact with one another. As explained above, by specifying the transition order so that the pieces of content display data are moved starting with the piece of content display data having the longest distance, followed by the other pieces of content display data in descending order of distance, the user is able to visually keep track of the transition of the piece of content display data on which the user's focus is placed.

Further, as for the method for specifying the transition order based on the moving directions, as explained in the modification example described above, it is possible to apply the same method by using transition directions from the intermediate layout to the post-change layout, instead of the transition directions from the pre-change layout to the intermediate layout, which are used by the first transition calculator 110.

As explained above, the second transition calculator 111 determines the transition order in the same manner as the first transition calculator 110 determines the transition order. As a result, it is possible to realize transitions of which it is easy for the user to keep track of the transition process. Further, like the first transition calculator 110, the second transition calculator 111 outputs the transition paths and the transition order that have been calculated in the format of a table as shown in FIG. 20.

The output unit 112 includes a transition position calculator 121 and a screen information generating unit 122. The output unit 112 generates display screen data containing the pieces of content display data that go through the transitions according to the transition paths and the transition orders that have been calculated by the first transition calculator 110 and the second transition calculator 111.

The transition position calculator 121 calculates, for each of a plurality of predetermined periods, position information of the pieces of content display data that go through the transitions according to the transition paths and the transition orders that have been calculated by the first transition calculator 110 and the second transition calculator 111. By calculating the position information for each of the predetermined periods in this manner, the transition position calculator 121 is able to calculate the position information indicating that the pieces of content display data gradually go through transitions, from the positions in the pre-rearrangement layout to the positions in the intermediate layout, and from the positions in the intermediate layout to the positions in the post-rearrangement layout. The calculation of the transition positions is performed until all the pieces of content display data are laid out in the positions that have been specified as the positions in the post-rearrangement layout. According to the first embodiment, the predetermined periods correspond to the length of the time intervals at which the display screen is updated.

The transition position calculator 121 determines that the transition orders that have been calculated by the first transition calculator 110 and the second transition calculator 111 will be used as the orders in which transitions are made on the pieces of content display data, so that the transitions of the pieces of content display data are started at the predetermined time intervals. Further, the transition position calculator 121 calculates, for each of the predetermined periods, position information of the pieces of content display data on which the transitions have been started.

The screen information generating unit 122 generates, for each of the predetermined periods, display screen information in which the pieces of content display data are laid out at the positions indicated by the position information that has been calculated by the transition position calculator 121 and outputs the generated display screen information to the display controlling unit 115. According to the first embodiment, the output destination of the generated display screen information is the display controlling unit 115; however, the output destination may be a display device or the like that is connected to the display processing apparatus 100 via a network.

Further, the screen information generating unit 122 is also able to apply a special visual effect to the piece of content display data on which a next transition is to be made, by monitoring the transition order of the pieces of content display data. For example, the screen information generating unit 122 may apply a special visual effect to the piece of content display data on which a next transition is to be made so that the piece of content display data appears differently from the other pieces of content display data. As a result, it becomes easier for the user to distinguish the piece of content display data from the other pieces of content display data. Consequently, it is possible to attract the user's attention.

It is possible to determine the piece of content display data on which a next transition is to be made by referring to the transition orders that have been calculated by the first transition calculator 110 and the second transition calculator 111. Alternatively, it is also possible to determine the piece of content display data on which a next transition is to be made by storing such a portion of the position information of the pieces of content display data that has been calculated by the transition position calculator 121 that corresponds to a plurality of frames and comparing the position information of the pieces of content display data between the frames.

With an arrangement in which the screen information generating unit 122 applies a visual effect to the piece of content display data on which a next transition is to be made, in a number of frames at the beginning of the transition process or in all the frames during the transition process, it becomes easy for the user to distinguish the piece of content display data from the other pieces of content display data and to keep track of the transition process. Examples of the visual effect include applying a highlight effect by raising the luminance level of the piece of content display data on which a next transition is to be made so that the luminance level thereof becomes higher than those of the other pieces of content display data. By making the luminance level higher, it is possible to direct the user's attention more to the piece of content display data than to the other pieces of content display data. Further examples of the visual effect other than the highlight effect include changing the transmission rate and applying a feathering effect. It is acceptable to use any other types of visual effects as long as it is possible to create a visual difference between the piece of data on which a next transition is to be made and the other pieces of data.

With this arrangement in which the transition position calculator 121 and the screen information generating unit 122 generate the display screen information in which the transitions are made on the positions of the pieces of content display data for each of the predetermined periods, and also, the display controlling unit 115 exercises display control on the display screen information as explained below, it is possible to provide an animation display.

The transition completion judging unit 114 judges whether the position information of the pieces of content display data that has been calculated by the transition position calculator 121 matches the position information of the pieces of content display data corresponding to the post-rearrangement layout. In the case where the transition completion judging unit 114 has judged that the former position information matches the latter position information with respect to all the pieces of content display data, the transition completion judging unit 114 outputs information indicating the judging result to the updating unit 113.

Another arrangement is acceptable in which, instead of performing the judging process based on the position information as described above, the transition completion judging unit 114 performs a judging process by specifying, in advance, the number of steps required in generation of display image data to provide an animation display and judging that the transitions have completed when the count for the number of performed steps has reached the specified number of steps. In this situation, the number of steps is determined based on a time period during which the animation display should be performed and the frame rate indicating how many times the display is updated during each unit period. More specifically, it is possible to determine the number of steps by multiplying the animation display time period by the frame rate. The animation display is realized when the display controlling unit 115 displays the layout of the pieces of content display data at each of the steps.

When the updating unit 113 has received an input of the information indicating that the calculated position information matches the position information in the post-rearrangement layout from the transition completion judging unit 114, the updating unit 113 updates the position information of the pieces of content display data stored in the pre-change layout storing unit 108, with the position information of the pieces of content display data stored in the post-change layout storing unit 116. As a result, it is possible to use the current position information of the pieces of content display data, as the position information corresponding to a pre-rearrangement layout, when the next rearranging process is performed.

The display controlling unit 115 includes a first display processing unit 131, a second display processing unit 132, and a third display processing unit 133. The display controlling unit 115 exercises display control over the display monitor 150 by using the screen information that has been output by the output unit 112.

By using the screen information that has been output by the output unit 112, the first display processing unit 131 performs a display process to cause the display monitor 150 to display, as a display of the pre-rearrangement layout, the coordinate system in the form of the conical surface and the plurality of pieces of content display data representing the contents in the coordinate system.

By using the screen information that has been output by the output unit 112, the second display processing unit 132 changes the virtual space having the coordinate system in the form of the conical surface and being displayed on the display monitor 150 to the virtual plane, before the rearranging process is performed based on the selection that has been made by the selecting unit 104. Also, the second display processing unit 132 performs the animation display by making the transitions on the pieces of content display data, from the pre-rearrangement layout to the intermediate layout, as explained above. As for the rules used for making the transitions, as explained above, the rearranging process is performed based on, for example, the attributes of the contents.

When the transition display performed by the second display processing unit 132 has been completed, the third display processing unit 133 changes, by using the screen information that has been output by the output unit 112, the virtual space being displayed on the display monitor 150 to a display having the coordinate system in the form of the conical surface, and further performs an animation display by making the transitions on the pieces of content display data, from the intermediate layout to the post-rearrangement layout.

The animation display performed by the constituent elements of the display controlling unit 115 as described above is realized by updating the screen information according to an arbitrary frame rate.

Figure 21:
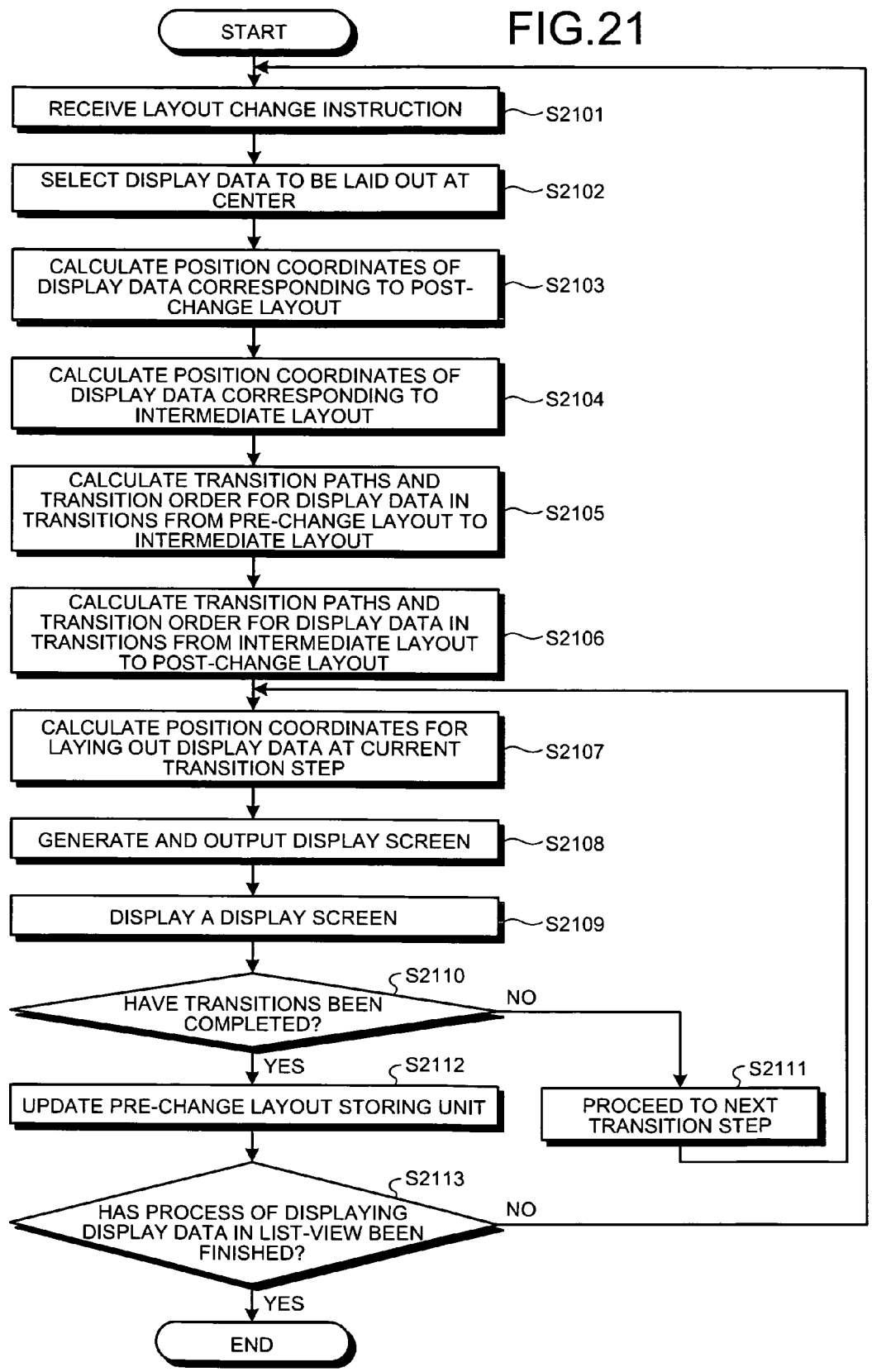
FIG. 21 is a flowchart of a display processing procedure performed by the display processing apparatus according to the first embodiment.

Next, a display processing procedure performed by the display processing apparatus 100 according to the first embodiment will be explained, with reference to FIG. 21.

First, the input controlling unit 103 receives an instruction for a layout change from an input device (step S2101). The instruction for a layout change is assumed to have been issued when a selection is made out of the pieces of content display data that are displayed. Another arrangement is acceptable in which the instruction for the rearranging process is received from an internal control mechanism within the display processing apparatus 100, instead of from the user.

Next, the selecting unit 104 selects one of the pieces of content display data to be laid out at the center of the coordinate system in the form of the conical surface (step S2102). According to the first embodiment, the piece of content display data that has been received as the user's selection is to be laid out at the center.

According to the instruction indicating that a rearranging process should be performed, the post-change layout specifying unit 107 specifies the contents that are the layout targets by referring to the content-attribute information storage unit 102, calculates the position information of the pieces of content display data that represent the specified contents corresponding to the post-rearrangement layout, and stores the calculated position information into the post-change layout storing unit 116 (step S2103).

After that, the intermediate layout specifying unit 106 reads the attribute information of the contents that are the layout targets out of the content-attribute information storage unit 102. Also, the intermediate layout specifying unit 106 reads the position information of the pieces of content display data out of the post-change layout storing unit 116 and the pre-change layout storing unit 108, calculates the position information corresponding to the intermediate layout based on the read information, and stores the calculated position information corresponding to the intermediate layout to the intermediate layout storing unit 109 (step S2104).

Further, the first transition calculator 110 reads and compares the position information corresponding to the pre-change layout from the pre-change layout storing unit 108 and the position information corresponding to the intermediate layout from the intermediate layout storing unit 109 and calculates the transition paths and the transition order for the transitions from the positions indicated by the position information corresponding to the pre-change layout to the positions indicated by the position information corresponding to the intermediate layout (step S2105).

After that, the second transition calculator 111 reads and compares the position information corresponding to the intermediate layout from the intermediate layout storing unit 109 and the position information corresponding to the post-rearrangement layout from the post-change layout storing unit 116, and further calculates the transition paths and the transition order for the transitions from the positions indicated by the position information corresponding to the intermediate layout to the positions indicated by the position information corresponding to the post-change layout (step S2106).

Subsequently, based on the transition paths and the transition order for the transitions from the pre-rearrangement layout to the intermediate layout that have been calculated by the first transition calculator 110 and the transition paths and the transition order for the transitions from the intermediate layout to the post-rearrangement layout that have been calculated by the second transition calculator 111, the transition position calculator 121 calculates position information indicating that the pieces of content display data go through the transitions at the transition steps each of which is taken in a different one of the predetermined time periods (step S2107). The predetermined time periods are calculated based on, for example, the time intervals at which the screen on the display monitor 150 is updated.

After that, the screen information generating unit 122 generates screen information in which the pieces of content display data are laid out in the positions indicated by the position information that has been calculated by the transition position calculator 121 and outputs the generated screen information to the display controlling unit 115 (step S2108).

Subsequently, the display controlling unit 115 exercises display control over the screen information that has been input thereto (step S2109).

After that, the transition completion judging unit 114 judges whether the transitions have been completed (step S2110). In the case where the transition completion judging unit 114 has judged that the transitions have not yet been completed (step S2110: No), the transition completion judging unit 114 causes the transition process to proceed to the next transition step (step S2111) so that the processes at step S2107 and thereafter are performed again.

As explained above, the processes at steps S2107 through S2111 are repeatedly performed so that the first display processing unit 131, the second display processing unit 132, and the third display processing unit 133 that are included in the display controlling unit 115 perform the display processes. As a result, as shown in FIG. 7, it is possible to realize the animation display in which the virtual space changes from one to another and the pieces of content display data go through the transitions according to the transition paths, from the positions in the pre-rearrangement layout, to the positions in the intermediate layout, and further to the positions in the post-rearrangement layout.

After that, in the case where the transition completion judging unit 114 has judged that the transitions have been completed (step S2110: Yes), the updating unit 113 reads the position information corresponding to the post-rearrangement layout out of the post-change layout storing unit 116 and uses the read information to update the position information corresponding to a pre-rearrangement layout that is stored in the pre-change layout storing unit 108, so that the updated information can be used in the next rearranging process (step S2112).

After that, the display processing apparatus 100 judges whether the process of displaying the pieces of content display data in a list view has been completed (Step S2113). In the case where the display processing apparatus 100 has judged that the list-view display process has not yet been completed (step S2113: No), the process is started again from step S2101.

As explained above, when the display processing apparatus 100 according to the first embodiment is used, when the rearranging process is performed on the pieces of content display data, it is possible to, instead of directly rearranging the current layout into another layout within the same virtual space, perform the animation display in which the pieces of content display data are temporarily laid out in the virtual space of lower dimension than the virtual space used in the pre-rearrangement and the post-rearrangement layouts, before the pieces of content display data are organized into the intended layout.

In addition, when the display processing apparatus 100 is used, it is easy for the user to understand the transitions of the pieces of content display data during the rearranging process of the pieces of content display data that is displayed on the display device.

Further, to perform the animation display of the processes of the layout change, the order in which the transitions are made is determined based on the information related to the transition paths from the positions indicated by the position information corresponding to the pre-rearrangement layout to the positions indicated by the position information corresponding to the intermediate layout. Also, the order in which the transitions are made is determined based on the information related to the transition paths from the positions indicated by the position information corresponding to the intermediate layout to the positions indicated by the position information corresponding to the post-rearrangement layout. As a result, it is easy for the user to keep track of a piece of content display data on which the user's focus is placed, and thus, the level of visual observability is improved.

Further, the position information corresponding to the intermediate layout is determined abased on the attribute information of the contents. For example, in the case where the contents are picture contents, the pre-rearrangement layout and the post-rearrangement layout are layouts based on the degrees of relevance between the contents as shown in FIG. 2, whereas the intermediate layout is a layout in the format of a broadcast-program listing as shown in FIG. 16. As a result, the transitions are first made into the layout in which it is easy for the user to recognize the meanings, before further transitions are made to the next layout. Thus, it is easy for the user to understand the transitions of the contents.

In the description of the first embodiment above, the example is explained in which the positions in which the pieces of content display data are laid out and the display sizes thereof in the intermediate layout are specified in advance. However, the first embodiment is not limited to this example where the layout positions and the display sizes are specified in advance. Next, as a first modification example of the first embodiment, an example will be explained in which only attributes used for laying out pieces of content display data in an intermediate layout are defined for each of the axes.

Figure 22:
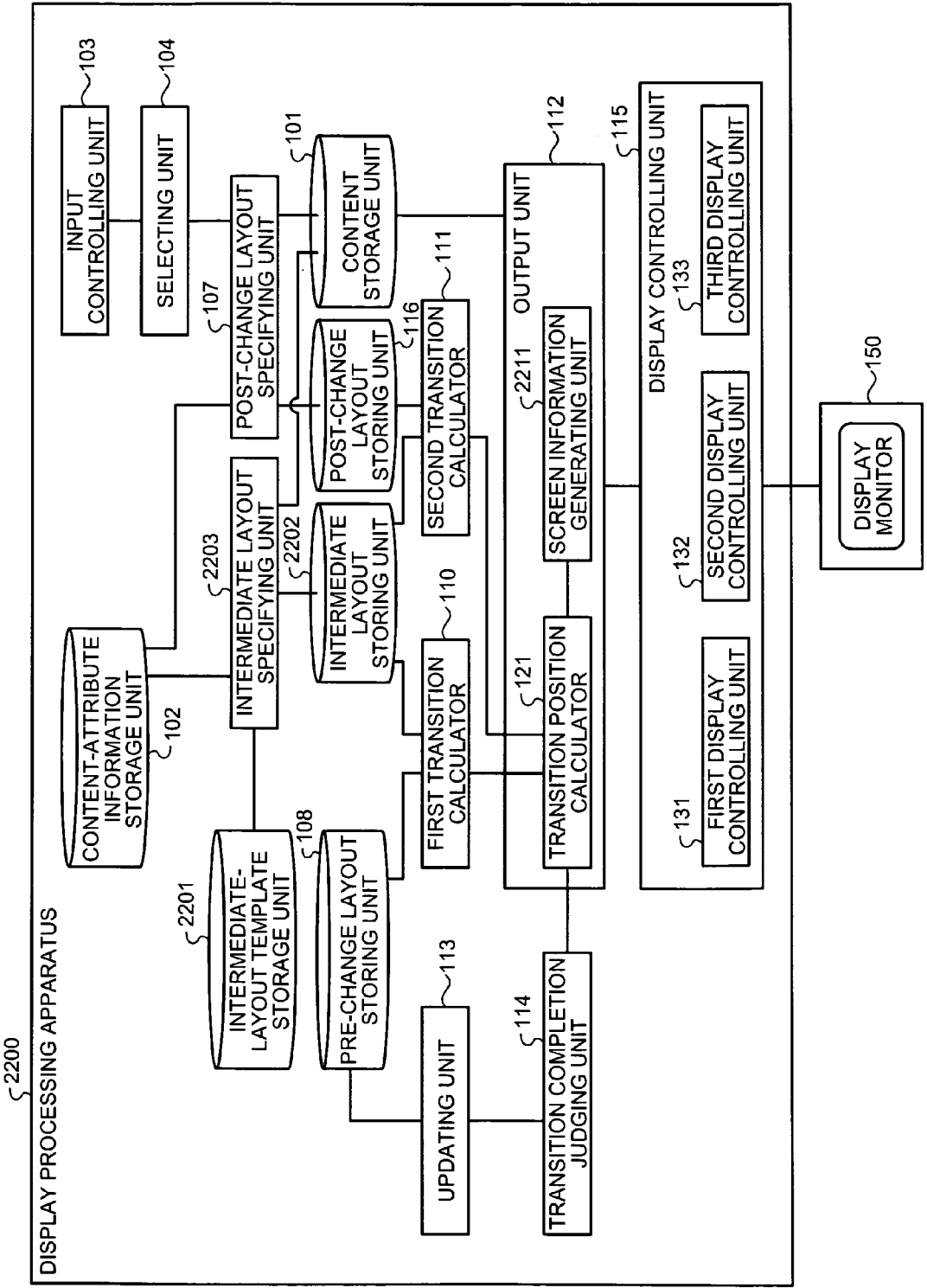
FIG. 22 is a block diagram of a display processing apparatus according to a first modification example of the first embodiment.

A display processing apparatus 2200 shown in FIG. 22 is different from the display processing apparatus 100 according to the first embodiment described above in that the display processing apparatus 2200 includes: an intermediate-layout template storage unit 2201 instead of the intermediate-layout template storage unit 105; an intermediate layout specifying unit 2203 instead of the intermediate layout specifying unit 106; an intermediate layout storing unit 2202 instead of the intermediate layout storing unit 109; and a screen information generating unit 2211 instead of the screen information generating unit 122. Explanation will be omitted for some of the configurations of the display processing apparatus 2200 according to the first modification example of the first embodiment that are the same as those of the display processing apparatus 100 according to the first embodiment.

Unlike the first embodiment in which the layout of the data is directly specified in the form of slots, the intermediate-layout template storage unit 2201 defines axis information and an attribute to be assigned to each of one or more arbitrary axes. It is possible to specify a layout of pieces of content display data by defining the axis information and the assigned attribute for each of the axes the total quantity of which is equal to the dimension number of the space used in the intermediate layout (e.g., if the space used in the intermediate layout is a two-dimensional space, "two" will be referred to as the dimension number). The intermediate-layout template storage unit 2201 according to the first modification example stores therein a first template management table storing therein the axis information and a second template management table storing therein attribute information.

As shown in FIG. 23, the first template management table stored in the intermediate-layout template storage unit 2201 stores therein, as the axis information, axis numbers, axis directions, starting points (coordinates), and lengths, while keeping them in correspondence with one another. Each of the axis directions is the direction in which the corresponding one of the axes is oriented in the intermediate layout space. For example, in the case where the virtual space used in the intermediate layout is a plane, the axis directions are expressed with two-dimensional vectors. The coordinates of each of the starting points indicate the position of the starting point of the corresponding one of the axes. Each of the lengths is the length of the corresponding one of the axes. In the case where the virtual space used in the intermediate layout is two-dimensional, the first template management table stores therein two pieces of axis information. In the case where the virtual space is one-dimensional, the first template management table stores therein one piece of axis information. As explained here, the first template management table stored in the intermediate-layout template storage unit 2201 stores therein as many pieces of axis information as the dimension number of the intermediate layout. Generally speaking, it is possible to define any position in a virtual space as a linear combination of as many basis vectors as the dimension number of the space. Thus, by defining, as basis vectors, pieces of axis information the total quantity of which is equal to the dimension number of the intermediate layout, it is possible to uniquely determine the layout of the pieces of content display data in the virtual space.

The first template management table shown in FIG. 23 stores therein information indicating that Axis 1 is oriented in a direction parallel to the x-direction, whereas Axis 2 is oriented in a direction parallel to the y-direction. The pieces of content display data will be laid out along these two axes.

As shown in FIG. 24, the second template management table stored in the intermediate-layout template storage unit 2201 stores therein corresponding axes, data attributes, and attribute values (i.e., values and positions), while keeping them in correspondence with one another. Each of the data attributes is an attribute to be assigned to a corresponding one of the corresponding axes. As each of the attribute values, "values" of the pieces of content display data for the corresponding axis and "positions" to be respectively assigned to the "values" are stored, while being kept in correspondence with each other.

Each of the values shown under the column "POSITIONS" in the second template management table shown in FIG. 24 is specified as a relative position expressed while the starting point of the axis is expressed as 0, whereas the ending point of the axis is expressed as 1. As for the values shown under the column "VALUES", in the case where values are written in parenthesis while being separated by commas as in the example of Axis 2, the range between the elements separated by the comma is treated as a serial-value range. Thus, when a piece of data having a value within the range is to be laid out, the position of the value on the axis is calculated within the range assigned to the axis, for each of the values separated by the commas. In the case where each individual value is shown in parentheses, as in the example of Axis 1, each of the attribute values can only be a specific non-serial value.

As explained above, by referring to the template management tables described above, it is possible to specify the attributes that are respectively to be assigned to the axes as well as the positions in which the pieces of content display data are to be laid out and the sizes thereof, based on the attributes of the contents. As shown in FIG. 24, as for the broadcast stations expressed on the corresponding axis "Axis 1", a position is specified in advance for each of the values. In contrast, as for the broadcast periods expressed on the corresponding axis "Axis 2", the range of the values and the range of specifiable positions are specified. Thus, the intermediate layout specifying unit 2203 specifies the display size of each of the pieces of content display data in the intermediate display, according to the broadcast period of the content.

In the case where the attribute values assigned to the corresponding axis "Axis 1" shown in FIG. 24 are non-serial values such as channel numbers indicating broadcast stations, the attributes values that are namely "Channel 1", "Channel 2", "Channel 3", and "Channel 4" are assigned to the axis at regular intervals.

In the case where the attribute values assigned to the corresponding axis "Axis 2" shown in FIG. 24 are serial values such as broadcast starting time, it is possible to determine a layout of each of the pieces of content display data by specifying the broadcast starting time at the axis starting position and the broadcast starting time at the axis ending position. For example, in the case where the broadcast starting time at the axis starting position is specified as Oct. 10, 2008 -19:00, whereas the broadcast starting time at the axis ending position is specified as Oct. 10, 2008 -21:00, the intermediate layout specifying unit 2203 (explained later) specifies the position information of a piece of content display data of which the broadcast starting time is Oct. 10, 2008 -20:00 in such a manner that the piece of content display data is laid out so as to start at the middle point of the axis.

As explained above, the information indicating the correspondence relationships between the axes and the data attributes is managed in the table (i.e., the second template management table) that is separate from the first template management table. With this arrangement in which the first template management table stores therein the axis information whereas the second template management table stores therein the axis numbers and the position information of the axes, it is possible to eliminate, from the first template management table, description of the attribute information that is dependent on the pieces of content display data. As a result, it is possible to improve reusability of the templates. Further, if both the axis information and the attribute information of the contents were stored in one table, it would be necessary to edit the template information to lay out a group of pieces of data that does not have a specific attribute and a group of pieces of data that has the specific attribute in the same virtual space layout. Thus, reusability of the template would be lower. As explained above, by eliminating the attributes of the data and writing the templates based on the abstract concepts, it is possible to improve the level of reusability.

Returning to the description of FIG. 22, by referring to the first template management table and the second template management table that are stored in the intermediate-layout template storage unit 2201, the intermediate layout specifying unit 2203 is able to specify the positions in which the pieces of content display data are to be laid out. By combining the information in the first template management table with the information in the second template management table, the intermediate layout specifying unit 2203 is able to specify an arbitrary attribute of the pieces of content display data and a range of the attribute values that have been assigned to each of the axes. As a result, the intermediate layout specifying unit 2203 is able to directly lay out the pieces of content display data in the virtual space corresponding to the intermediate layout.

Next, an example of a data layout in which the templates described above are used will be explained. The content attribute information shown in FIG. 12 will be used as the pieces of data to be laid out.

Figure 25:
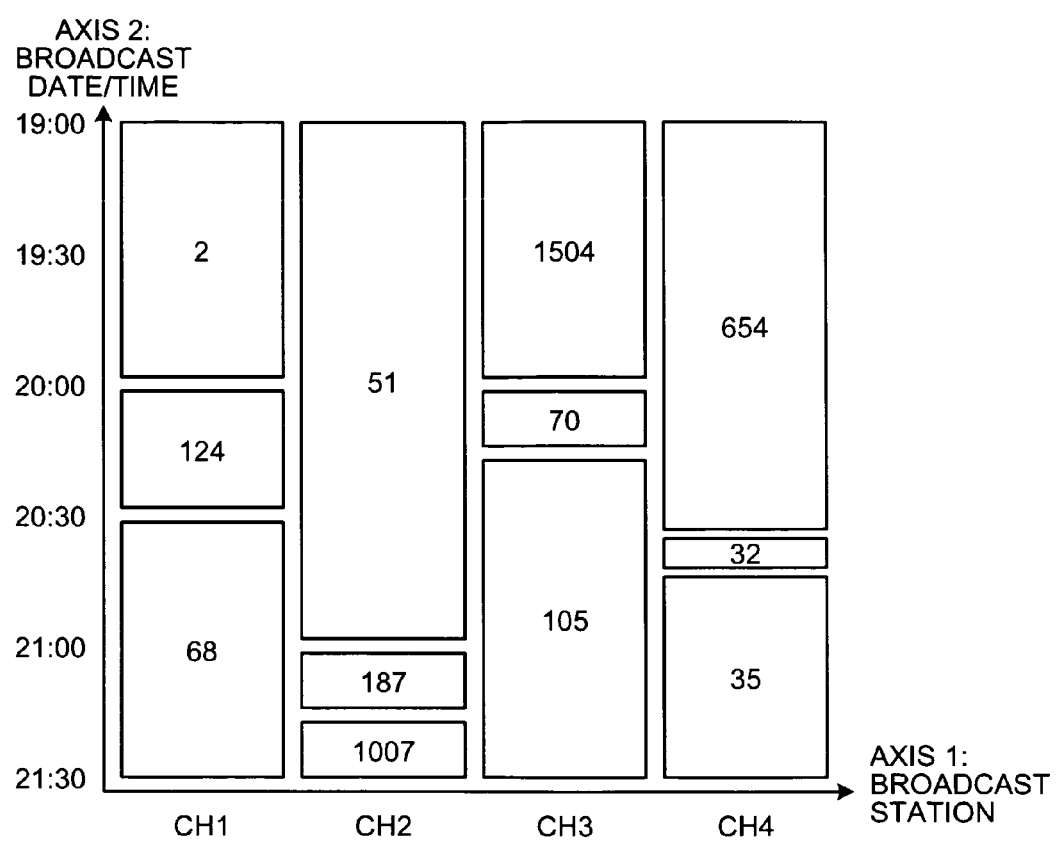
FIG. 25 is a drawing illustrating an example of screen information displayed in an intermediate layout by a display controlling unit according to the first modification example of the first embodiment.

In this situation, by using the template management tables that are described above, the intermediate layout specifying unit 2203 specifies position information of the pieces of content display data as shown in FIG. 25.

For example, in the case where the attribute assigned to an axis can only have a specific non-serial value such as a channel number indicating a broadcast station, the intermediate layout specifying unit 2203 assigns attribute values to the axis by dividing the total length of the axis equally among the attribute values. For example, when the total length of the axis is expressed as 1, and there are four attribute values indicating the broadcast stations such as Channels 1 to 4, the position of Channel 1 is assigned at 0.125; the position of Channel 2 is assigned at 0.375, the position of Channel 3 is assigned at 0.625; and the position of Channel 4 is assigned at 0.875.

Further, in the case where the attribute assigned to an axis is an attribute having a range such as a broadcast period from a starting time to an ending time, the intermediate layout specifying unit 2203 assigns a position to each of the pieces of content display data, and also, adjusts the display area of each of the pieces of content display data according to the range of the broadcast period. For example, in the case where the broadcast period assigned to an axis is from Oct. 10, 2008 -19:00 to Oct. 10, 2008 -21:00, the intermediate layout specifying unit 2203 specifies the position information of a piece of content display data of which the broadcast starting time is Oct. 10, 2008 -19:00 and the broadcast ending time is Oct. 10, 2008 -20:00 by specifying position information indicating the starting point of the axis and position information indicating the middle point of the axis as the two endpoints of the display area of the piece of content display data in the direction along the axis.

By specifying the position information of each of the pieces of content display data as described above, the intermediate layout specifying unit 2203 is able to lay out the pieces of content display data in a format like a TV program listing in newspaper. Each of the numerical values written on the inside of the pieces of content display data shown in FIG. 25 is a data identifier.

The screen information generating unit 2211 generates screen information by changing the display sizes of the pieces of content display data during the transition process or immediately after the transition process is completed, so that each of the pieces of content display data that go through the transitions on the transition paths from the pre-rearrangement layout to the intermediate layout has a display size that has been assigned within the virtual space corresponding to the intermediate layout.

As explained above, the method by which the template management tables used for the intermediate layout are stored has an advantageous effect where the degree of freedom in designing the intermediate layout is relatively high. For example, in the case where the virtual space in which the data is to be laid out and that is calculated by the post-change layout specifying unit 107 has been changed in such a manner that the dimension number of the virtual space used in the intermediate layout is equal to or higher than the dimension number of the virtual space that has been specified by the post-change layout specifying unit 107, it is possible to change the dimension number of the virtual space used in the intermediate layout so as to be smaller than the dimension number of the virtual space used in the post-rearrangement layout by making corrections in the template management tables.

In the description of the first embodiment and the first modification example above, the examples in which the templates are used for the intermediate layout are explained. However, another arrangement is acceptable in which the position information of the pieces of content display data corresponding to the intermediate layout is specified without using the templates. Next, as a second modification example of the first embodiment, an example will be explained in which the position information of the pieces of content display data corresponding to the intermediate layout is specified without using the templates.

According to the second modification example of the first embodiment, the intermediate layout specifying unit included in the display processing apparatus calculates the position information corresponding to the intermediate layout based on the position information of the pieces of content display data corresponding to the pre-rearrangement layout or to the post-rearrangement layout.

Figure 26:
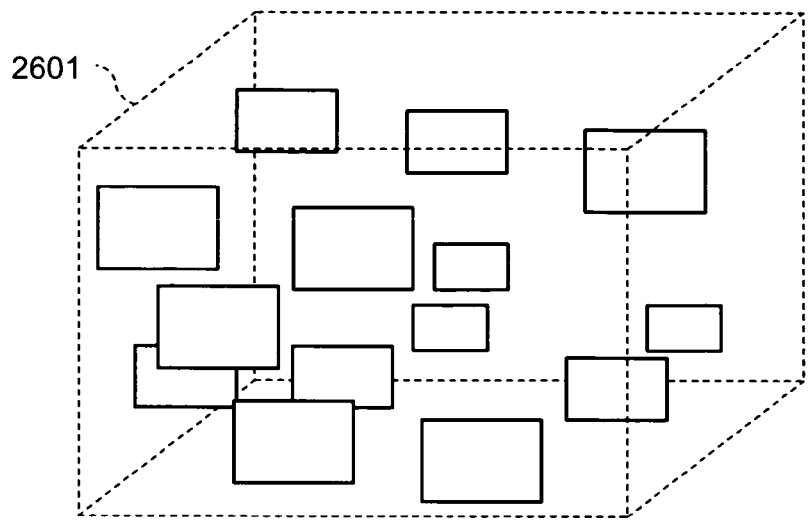
FIG. 26 is a drawing illustrating a minimum virtual area that encloses therein all the pieces of content display data that are display targets, according to a second modification example of the first embodiment.

In this situation, the intermediate layout specifying unit 2203 reads the position information of the pieces of content display data that is stored in the post-change layout storing unit 116 or in the pre-change layout storing unit 108. After that, the intermediate layout specifying unit 2203 calculates a virtual area 2601, as shown in FIG. 26, that is the minimal area that encloses therein all the pieces of content display data that are the display targets, based on the position information of the pieces of content display data that have been read. In the display area in a virtual three-dimensional space, this calculation process is equivalent to calculating a boundary box that encloses therein all the pieces of content display data that are laid out.

Figure 27:
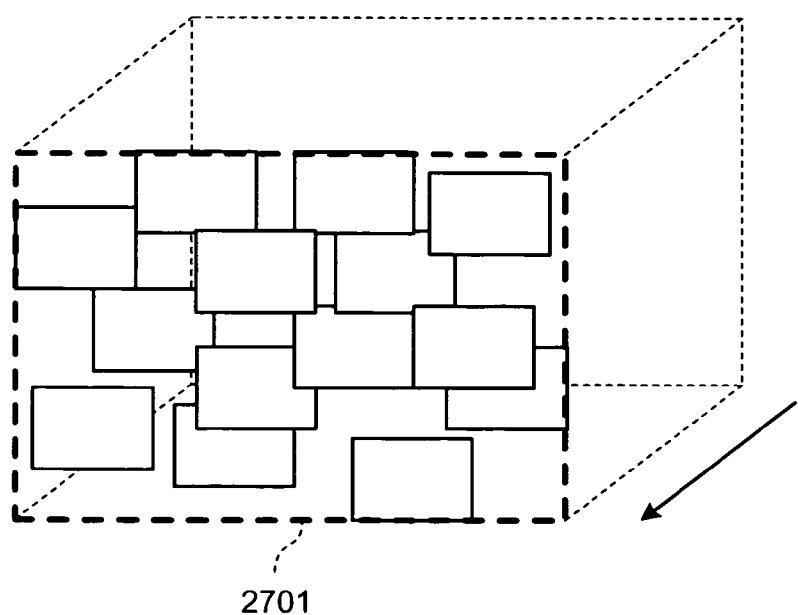
FIG. 27 is a drawing for explaining a method for using the minimum virtual area shown in FIG. 26 as a virtual plane used in an intermediate layout.

Subsequently, as shown in FIG. 27, the intermediate layout specifying unit 2203 generates a virtual space 2701 of lower dimension than the pre-change/post-change layout area by compressing the virtual area 2601 in an arbitrary direction. The compressing direction may be a certain direction that has been specified in advance or may be a direction specified according to an instruction from the user.

As an example in which the compressing direction is specified according to an instruction from the user, it is acceptable to use a method by which, when the user has selected an arbitrary one of the pieces of content display data being displayed, the compressing direction is specified based on the posture with which the selected piece of content display data is laid out. For example, in the case where the front direction while the selected piece of data is visualized is used as the compressing direction, it is easy for the user to understand the selection and the result caused by the selection, because the orientation of the selected target matches the orientation of the compressing direction. Thus, the user is able to select the compressing direction in an intuitive manner.

In the case where the method according to the second modification example of the first embodiment by which the intermediate layout is calculated based on the position information corresponding to the pre-rearrangement layout/the post-rearrangement layout, the virtual space used in the intermediate layout is dependent on the virtual space used by the post-change layout specifying unit 107 or the like. Thus, the degree of freedom in designing the virtual space used in the intermediate layout is lower. However, in the case where the virtual space used in the intermediate layout and the position information of the pieces of content display data in the virtual space are calculated in a dynamic manner based on the position information of the pieces of content display data corresponding to the post-rearrangement layout, even if the virtual space used by the post-change layout specifying unit 107 is changed, the virtual space used in the intermediate layout is also automatically changed along with that change. Thus, it is possible to reduce the work load in an editing process.

Figure 28:
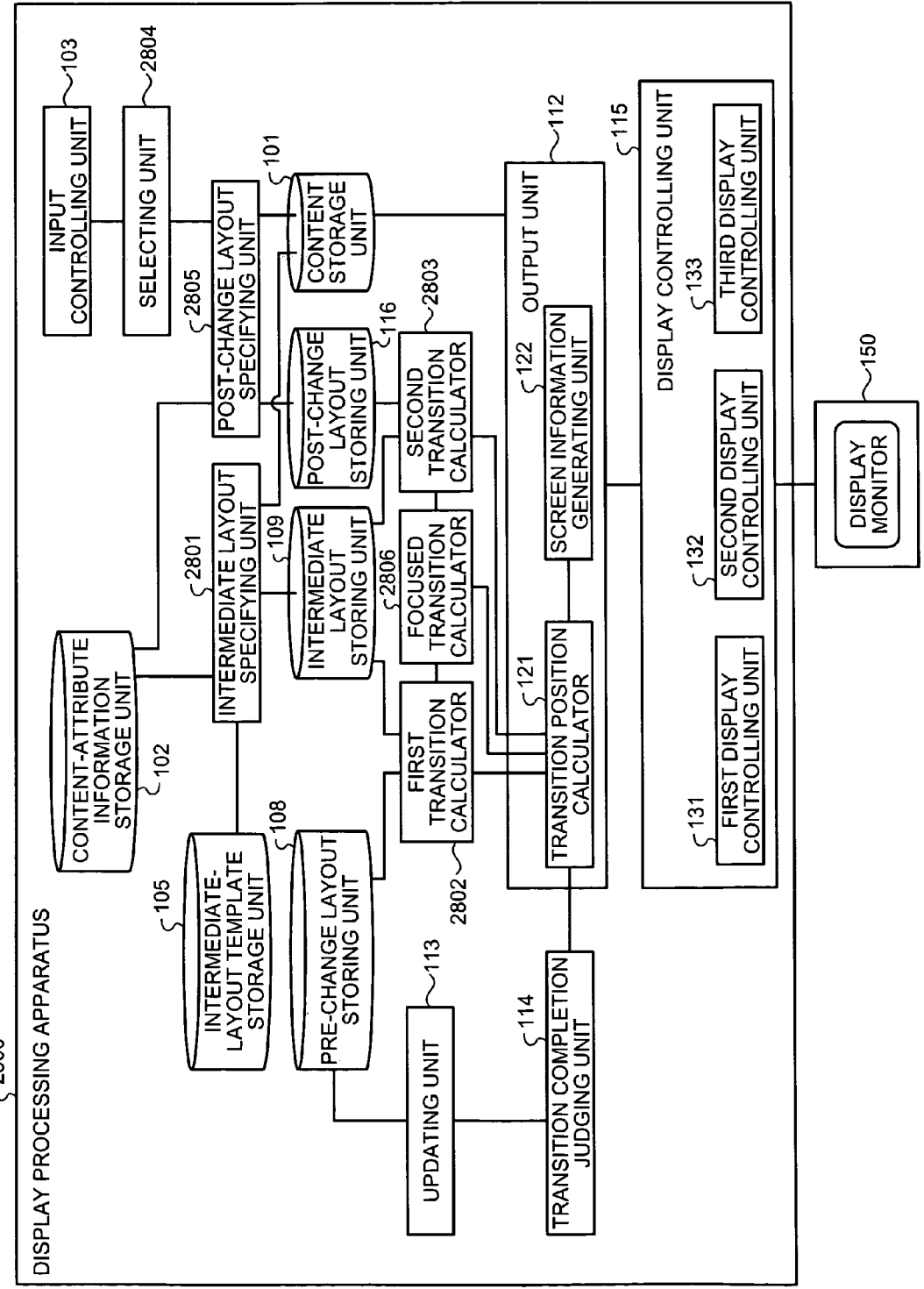
FIG. 28 is a block diagram of a display processing apparatus according to a second embodiment of the present invention.

As shown in FIG. 28, a display processing apparatus 2800 according to a second embodiment of the present invention is different from the display processing apparatus 100 according to the first embodiment described above in that the display processing apparatus 2800 includes: an intermediate layout specifying unit 2801 instead of the intermediate layout specifying unit 106; a post-change layout specifying unit 2805 instead of the post-change layout specifying unit 107; a first transition calculator 2802 instead of the first transition calculator 110; a second transition calculator 2803 instead of the second transition calculator 111; a selecting unit 2804 instead of the selecting unit 104, and that the display processing apparatus 2800 further includes a focused transition calculator 2806. Explanation will be omitted for some of the configurations of the display processing apparatus 2800 according to the second embodiment that are the same as those of the display processing apparatus 100 according to the first embodiment.

The display processing apparatus 2800 according to the second embodiment is configured so as to determine one of the pieces of content display data that is judged to have been selected by the user as a piece of focused content display data and to cause the piece of focused content display data to go through a transition different from transitions made on the other pieces of content display data. By arranging the transition made on the piece of focused content display data so as to be different from the transitions made on the other pieces of content display data, it is possible to make clearer in the display the transition process performed on the piece of content display data on which the user's focus is placed.

According to the second embodiment, when the user has selected a piece of focused content display data out of the pieces of content display data that are currently being displayed, the display processing apparatus 2800 starts a rearranging process on the pieces of content display data. The display processing apparatus 2800 according to the second embodiment separates the pieces of content display data into the piece of focused content display data and the other pieces of content display data by using selection information of the piece of focused content display data and separately performs processes of calculating transition paths and a transition order. Thus, the display processing apparatus 2800 is able to perform animation displays separately for the piece of focused content display data and for the other pieces of content display data.

Figure 29:
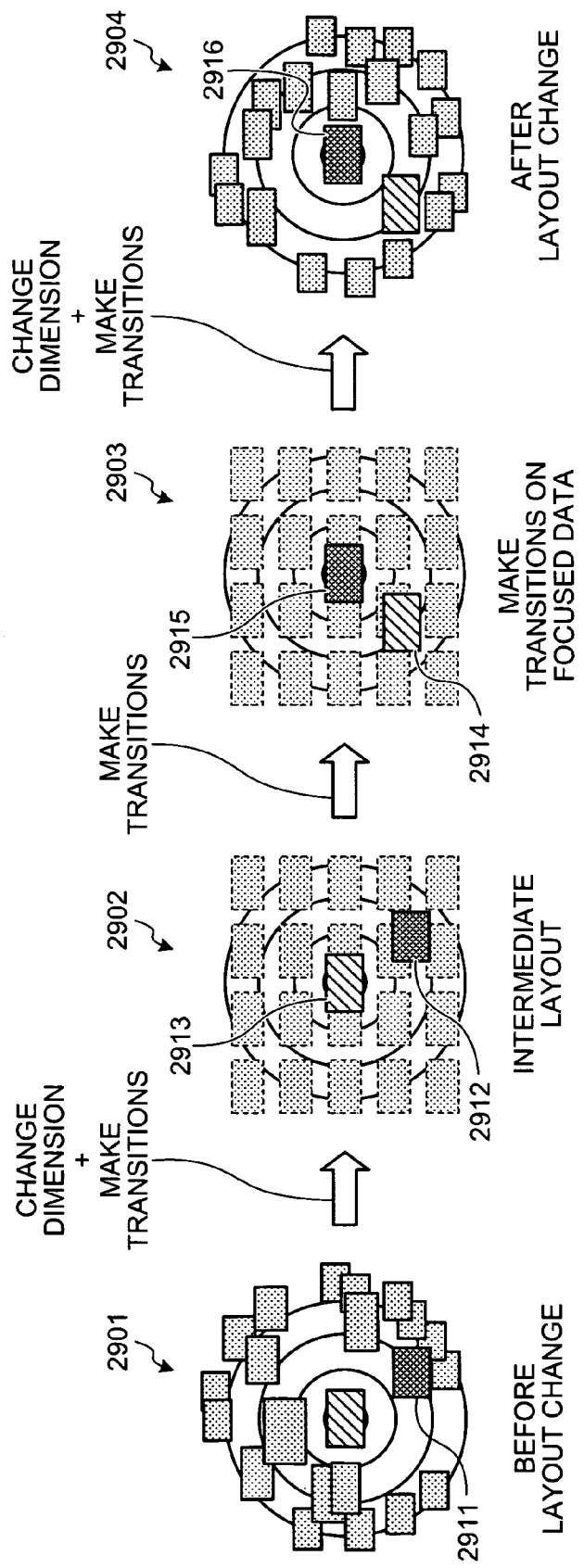
FIG. 29 is a conceptual drawing for explaining changes of virtual spaces and transitions of pieces of display data that are displayed by the display processing apparatus according to the second embodiment.

For example, in the case where, as shown in FIG. 29, a piece of focused content display data 2911 has been selected in a virtual three-dimensional space 2901 corresponding to a pre-rearrangement layout, the display processing apparatus 2800 makes, to obtain an intermediate layout 2902, transitions on the other pieces of content display data, without making transitions on a piece of focused content display data 2912 and another piece of focused content display data 2913 from the immediately preceding process. After that, as shown in an intermediate layout 2903, the display processing apparatus 2800 makes transitions on a piece of focused content display data 2915 and another piece of focused content display data 2914 from the immediately preceding process. Subsequently, the display processing apparatus 2800 makes transitions on the other pieces of content display data so as to move them into a virtual three-dimensional space 2904 corresponding to the post-rearrangement layout, based on the degrees of relevance to a piece of focused content display data 2916. As a result, it is possible to make clearer the transition of the pieces of focused content display data and to perform the rearranging process on the pieces of content display data without causing the user to lose track of the data on which the user's focus is placed.

First, the input controlling unit 103 receives a user's operation indicating that the focused content display data should be changed. While the display processing apparatus 2800 is displaying pieces of content display data, the user is able to change the focused content display data by using an input device such as a mouse, a keyboard, or a remote control device and selecting a piece of display data that the user wishes to select as the piece of focused content display data. For example, in the case where a mouse is being used, the user directly selects the piece of content display data by using a pointer. In the case where a keyboard or a remote control device is being used, the user moves a cursor or the like that is able to put the piece of content display data into a selected state by using direction keys and specifies the piece of content display data as the focused content display data by pushing an "enter" key. In the case where the user wishes to select a piece of content display data that is not displayed, it is acceptable to use a method by which the contents that are stored in the content storage unit 101 or the content-attribute information storage unit 102 are displayed in a list so that the user is able to make a selection out of the list or another method by which a search is conducted by using an arbitrary attribute specified by the user. In the case where the contents are displayed in a list, the user selects, out of the list, an arbitrary one of the contents that are displayed as pieces of content display data, by using a mouse or a keyboard. In the case where the selection is made by conducting a search, a field into which a search condition can be input is displayed, so that a search can be conducted after the user has input an arbitrary search condition into the field. The user selects one of the contents that are presented as a result of the search and thus selects a piece of display data indicating the selected content as a piece of focused content display data.

Further, in addition to the functions of the selecting unit 104 according to the first embodiment, the selecting unit 2804 stores therein identification information used for identifying the piece of focused content display data selected in the immediately preceding process and the piece of focused content display data in the post-rearrangement layout (hereinafter, the "post-rearrangement piece of focused content display data"). By transmitting information related to the piece of focused content display data and the post-rearrangement piece of focused content display data to the post-change layout specifying unit 2805, the selecting unit 2804 instructs that a rearranging process should be performed on the pieces of content display data.

The intermediate layout specifying unit 2801 specifies position information indicating the layout positions of the pieces of content display data, other than the piece of focused content display data that has been selected by the selecting unit 2804.

The intermediate layout specifying unit 2801 further receives, from the selecting unit 2804, an input of the information related to the piece of focused content display data and the post-rearrangement piece of focused content display data, and the intermediate layout specifying unit 2801 excludes the pre-rearrangement piece of focused content display data and the post-rearrangement piece of content display data from the targets of the rearranging process. As a result, only the pieces of focused content display data from the immediately preceding process and the current process are excluded from the intermediate layout. Thus, it is easy for the user to visually keep track of the pieces of content display data on which the user's focused is placed. The method used for specifying the position information of the pieces of content display data other than the pieces of focused content display data corresponding to the intermediate layout is the same as the method used in the first embodiment. Thus, the explanation thereof will be omitted.

Another arrangement is acceptable in which, instead of excluding the pieces of focused content display data, the intermediate layout is calculated based on focus information (i.e., information related to the pieces of focused content display data such as position information of the pieces of focused content display data). For example, it is acceptable to determine the position information of the pieces of focused content display data corresponding to the intermediate display by using the position information of the pieces of focused content display data corresponding to the pre-rearrangement layout. With this arrangement, it is easier for the user to recognize the transition process of the pieces of focused content display data than the transition process of the other pieces of content display data.

For instance, an example in which the post-rearrangement virtual space layout is a layout in the form of a conical surface as shown in FIG. 2 will be explained. In this situation, by using a virtual plane or a virtual straight line of which the direction of a normal line matches the direction of a normal line to the conical surface in the position of the focused content display data in the pre-rearrangement layout, as the virtual space corresponding to the intermediate layout, it is possible to keep the movement amount of the focused content display data minimum. As a result, the user is able to easily distinguish the focused content display data from the other pieces of content display data. Consequently, it is easy for the user to recognize the transition process performed on the focused content display data. Generally speaking, it is possible to calculate the direction of a normal line to a conical surface based on the position of the focused content display data in the pre-rearrangement layout, by using an equation of a conical surface. It is possible to calculate the intermediate layout based on the focus information by using the normal line to the conical surface that has been calculated and the position of the focused content display data in the pre-rearrangement layout, as the normal line to the plane or the straight line with which the intermediate layout is defined.

When the focused content display data has been changed, the selecting unit 2804 transmits the focus information (i.e., the information of the pieces of focused content display data from the immediately preceding process and the current process) to the post-change layout specifying unit 2805. The post-change layout specifying unit 2805 receives the focus information as an instruction to start the layout changing process on the display data. According to the second embodiment, the post-change layout specifying unit 2805 specifies the position information of the pieces of content display data based on the focus information.

Further, in the case where the virtual space used in the post-rearrangement layout is in the form of a three-dimensional grid or a two-dimensional grid, an arrangement is acceptable in which the post-change layout specifying unit 2805 specifies, in advance, an arbitrary position in the grid (e.g., the upper left corner or the center) as the layout position for the focused content display data.

Figure 30:
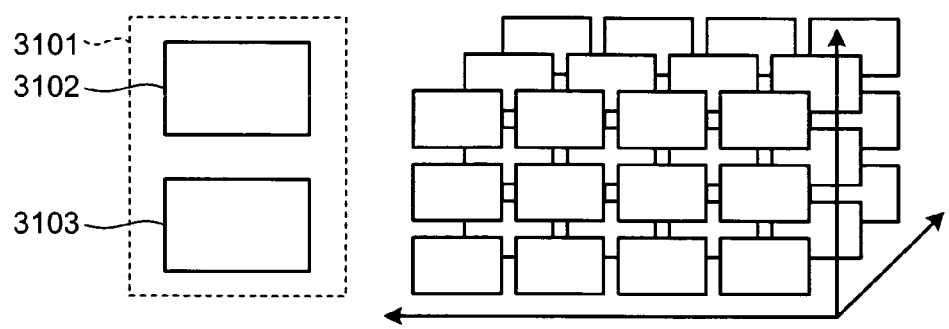
FIG. 30 is a drawing illustrating an example in which pieces of focused content display data are displayed in a separate area in the case where a virtual space in which pieces of content display data are displayed is a three-dimensional grid.
Figure 31:
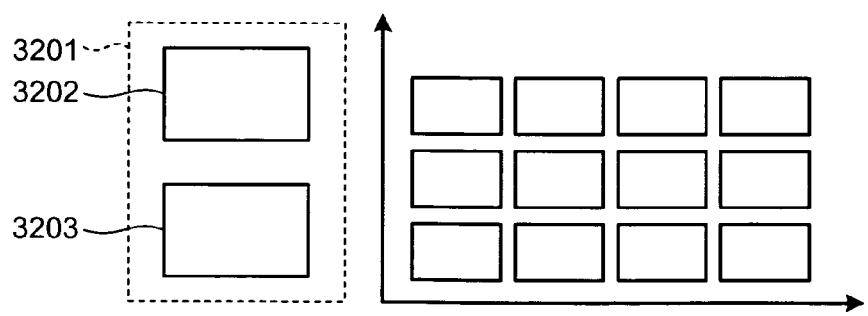
FIG. 31 is a drawing illustrating an example in which pieces of focused content display data are displayed in a separate area in the case where a virtual space in which pieces of content display data are displayed is a two-dimensional grid.

Further, the post-change layout specifying unit 2805 is also able to lay out the pieces of focused content display data in a special position. In the case where the virtual space used in the post-rearrangement layout is in the form of a three-dimensional grid, the post-change layout specifying unit 2805 may, as shown in FIG. 30, specify the position information so that a piece of focused content display data 3102 in the pre-rearrangement layout (from the immediately preceding process) is displayed in a display area 3101 on the outside of the grid together with a piece of focused content display data 3103 in the current process. Similarly, in the case where the virtual space used in the post-rearrangement layout is in the form of a two-dimensional grid, the post-change layout specifying unit 2805 may, as shown in FIG. 31, specify the position information so that a piece of focused content display data 3202 in the pre-rearrangement layout (from the immediately preceding process) is displayed in a display area 3201 on the outside of the grid together with a piece of focused content display data 3203 in the current process.

As explained above, with this arrangement in which the layout position for the piece of focused content display data in the pre-rearrangement layout (from the immediately preceding process) and the layout position for the piece of focused content display data in the post-rearrangement layout are specified within the display area in which the pieces of focused content display data are laid out, it is possible to enable the user to easily recognize the layouts of the pieces of focused content display data in the immediately preceding process and the current process.

The same applies to a layout using a layout space such as the virtual three-dimensional space as shown in FIG. 10 or a virtual two-dimensional space. With the arrangement in which arbitrary positions on the inside or the outside of the layout space is specified as the layout positions for the pieces of focused content display data, it is possible to realize a layout in which the user is able to easily recognize the pieces of focused content display data. In the layout in the form of a conical surface as shown in FIG. 2, by using the piece of display data laid out at the apex of the cone as a piece of focused content display data, it is possible not only to make it easy for the user to recognize the piece of focused content display data, but also to lay out the other pieces of content display data based on the degrees of relevance thereof to the piece of focused content display data. As a result, it is possible to determine the layout of all the pieces of display data that not only makes it easy for the user to recognize the piece of focused content display data, but also reflects the interest of the user.

The method for laying out the pieces of content display data that is used by the display processing apparatus 2800 according to the second embodiment is only an example. It is acceptable to use any other methods for calculating the layout by using the information related to the pieces of focused content display data.

By performing the same process as the one explained in the first embodiment, the first transition calculator 2802 according to the second embodiment calculates the information related to the transition paths and the transition order for the pieces of content display data other than the pieces of focused content display data, in the transitions from the pre-rearrangement layout to the intermediate layout.

Further, by performing the same process as the one explained in the first embodiment, the second transition calculator 2803 calculates the information related to the transition paths and the transition order for the pieces of content display data other than the pieces of focused content display data, in the transitions from the intermediate layout to the post-rearrangement layout.

The focused transition calculator 2806 calculates the transition paths and the transition order for the pieces of focused content display data, in the transitions from the pre-rearrangement layout to the post-rearrangement layout.

After that, by using an arbitrary method, the focused transition calculator 2806 specifies the transition order for the pieces of focused content display data, in the transitions from the pre-rearrangement layout to the post-rearrangement layout. As the method for specifying the transition order, it is acceptable to use a method by which a rule for specifying the transition order for the pieces of focused content display data is set in advance. An example of the rule is, after the transition from the pre-rearrangement layout to the intermediate layout has been completed, a transition should be made on the pieces of focused content display data so that the pieces of focused content display data are moved from the pre-rearrangement layout into the post-rearrangement layout, before transitions are made on the other pieces of content display data so that they are moved from the intermediate layout into the post-rearrangement layout. According to the second embodiment, the focused transition calculator 2806 specifies the transition order so that the transitions are made on the piece of focused content display data in the current process and the piece of focused content display data from the immediately preceding process in the order described above.

The display processing apparatus 2800 according to the second embodiment makes the transitions while the pieces of content display data other than the pieces of focused content display data are aligned in the space of lower dimension used in the intermediate layout. Thus, it is easy for the user to understand the transition process performed on the pieces of focused content display data.

As explained above, the focused transition calculator 2806 specifies the transition order that is suitable for the pieces of focused content display data. Accordingly, the display controlling unit 115 performs an animation display of the transitions of the pieces of content display data. Consequently, it is easy for the user to recognize the transition process of the pieces of focused content display data on which the user's focus is placed.

Figure 32:
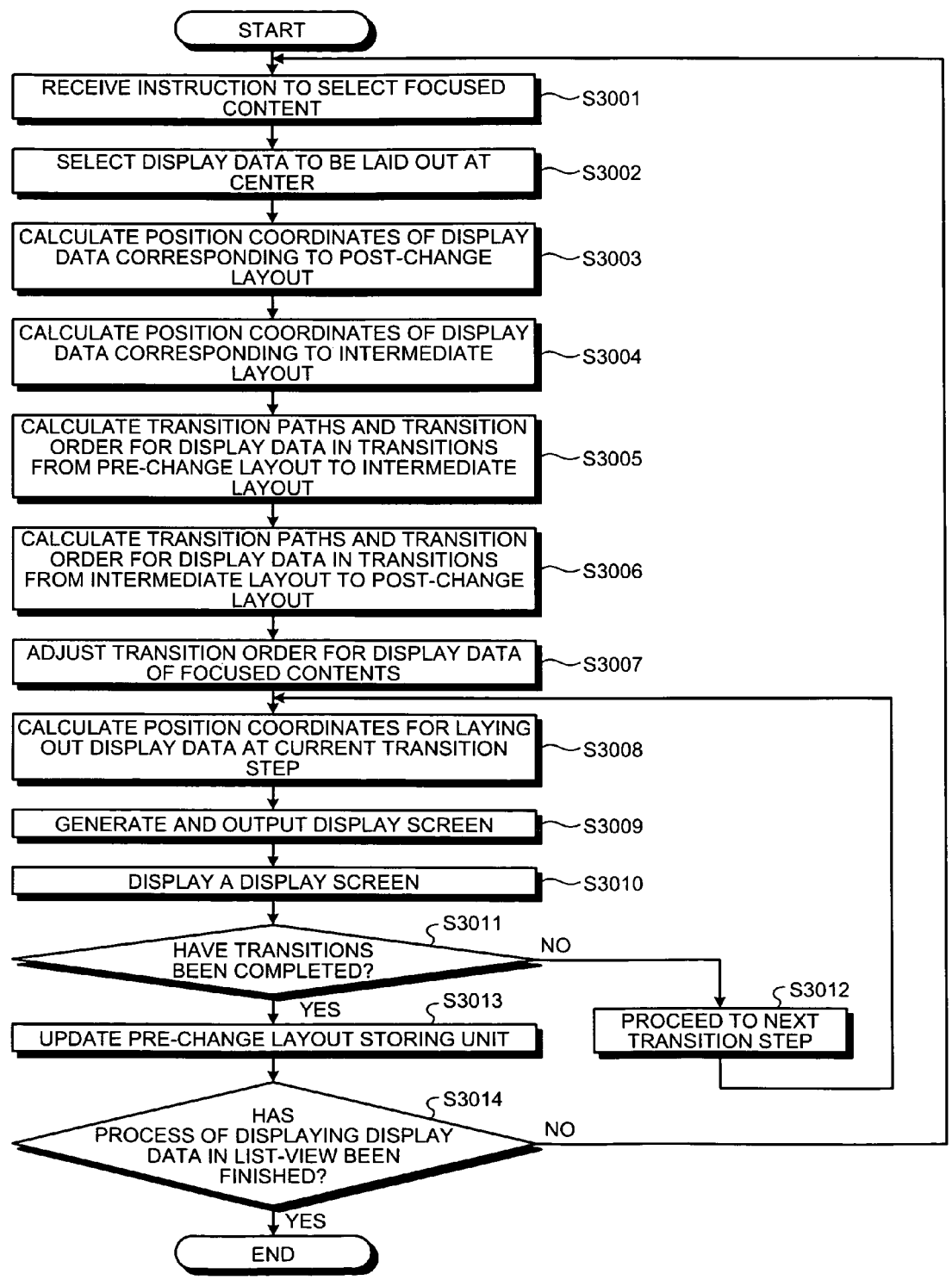
FIG. 32 is a flowchart of a display processing procedure performed by the display processing apparatus according to the second embodiment.

Next, a display processing procedure performed by the display processing apparatus 2800 according to the second embodiment will be explained, with reference to FIG. 32.

First, the input controlling unit 103 receives, from an input device, an instruction to select a piece of focused content display data (step S3001). Next, the selecting unit 2804 selects a piece of focused content display data to be laid out at the center of the coordinate system in the form of a conical surface (step S3002). The selecting unit 2804 stores therein the identification information used for identifying the piece of focused content display data that has been selected in the current process and a pre-rearrangement piece of focused content display data (which was selected in the immediately preceding process). The selecting unit 2804 outputs the identification information to the post-change layout specifying unit 2805. With this arrangement, it is possible to apply a special layout to the pieces of focused content display data.

Subsequently, according to an instruction for a rearranging process, the post-change layout specifying unit 2805 specifies the contents that are the targets to be laid out by referring to the content-attribute information storage unit 102. The post-change layout specifying unit 2805 further calculates the position information of the other pieces of content display data corresponding to the post-rearrangement layout, excluding the pre-rearrangement piece of focused content display data and the current piece of focused content display data from the pieces of content display data that are the targets to be laid out. The post-change layout specifying unit 2805 then stores the calculated position information into the post-change layout storing unit 116 (step S3003).

Next, the intermediate layout specifying unit 2801 reads, out of the content-attribute information storage unit 102, the attribute information of the contents other than the focused contents, among the contents that are the targets to be laid out. The intermediate layout specifying unit 2801 further reads the position information of the pieces of content display data out of the post-change layout storing unit 116 and the pre-change layout storing unit 108 and calculates the position information corresponding to the intermediate layout, based on the read position information. The intermediate layout specifying unit 2801 then stores the calculated position information corresponding to the intermediate layout into the intermediate layout storing unit 109 (step S3004). In other words, the intermediate layout specifying unit 2801 specifies the position information of the pieces of content display data other than the pieces of focused content display data, the position information corresponding to the intermediate layout.

After that, with respect to the pieces of content display data other than the pieces of focused content display data, the first transition calculator 2802 reads and compares the position information corresponding to the pre-change layout from the pre-change layout storing unit 108 and the position information corresponding to the intermediate layout from the intermediate layout storing unit 109 and calculates the transition paths and the transition order for the transitions from the positions indicated by the position information corresponding to the pre-change layout to the positions indicated by the position information corresponding to the intermediate layout (step S3005).

Subsequently, with respect to the pieces of content display data other than the pieces of focused content display data, the second transition calculator 2803 reads and compares the position information corresponding to the intermediate layout from the intermediate layout storing unit 109 and the position information corresponding to the post-rearrangement layout from the post-change layout storing unit 116 and calculates the transition paths and the transition order for the transitions from the positions indicated by the position information corresponding to the intermediate layout to the positions indicated by the position information corresponding to the post-change layout (step S3006).

After that, the focused transition calculator 2806 receives the transition order information that has been calculated by the first transition calculator 2802 regarding the transitions from the pre-change layout to the intermediate layout and the transition order information that has been calculated by the second transition calculator 2803 regarding the transitions from the intermediate layout to the post-change layout. After that, the focused transition calculator 2806 reads the focus information indicating, for example, the position information of the pieces of focused content display data corresponding to the post-rearrangement layout, out of the post-change layout storing unit 116. The focused transition calculator 2806 then specifies the transition order so that, after the transitions of the other pieces of content display data from the pre-change layout to the intermediate layout has been completed, transitions are made on the pieces of focused content display data directly from the pre-change layout to the post-change layout, before transitions are made on the other pieces of content display data from the intermediate layout to the post-change layout (step S3007).

Further, by performing the same processes as at steps S2107 through S2113 according to the first embodiment, an animation display in which the pieces of content display data go through the transitions is performed (steps S3008 through S3014).

As explained above, when the display processing apparatus 2800 according to the second embodiment is used, in addition to the advantageous effects of the first embodiment, as shown in FIG. 29, it is possible to display, in the intermediate layout, the pieces of focused content display data corresponding to the pre-rearrangement layout and the current process while distinguishing them from the other pieces of content display data. Thus, it is easy for the user to visually recognize the focused contents.

As explained above, the display processing apparatus 2800 according to the second embodiment is able to make it easy for the user to recognize the transition process of the pieces of content display data during the layout changing process of the pieces of content display data. Thus, the user is able to search for contents intuitively and efficiently.

Further, the display processing apparatus 2800 is configured so that the user's making selection of the piece of focused content display data is treated as an instruction for a layout change, while no transition to the intermediate layout is made on the pieces of focused content display data, so that the pieces of focused content display data are directly moved from the positions indicated by the position information corresponding to the pre-rearrangement layout to the positions indicated by the position information corresponding to the post-rearrangement layout. As a result, it is easy for the user to clearly recognize the transition process of the pieces of focused content display data.

Also, the display processing apparatus 2800 according to the second embodiment is able to determine the intermediate layout, based on how the content display data on which the user's focused is placed is laid out. Thus, it is possible to perform an intuitive animation display that makes it is easy for the user to anticipate the transition state of the layout of the data.

Figure 33:
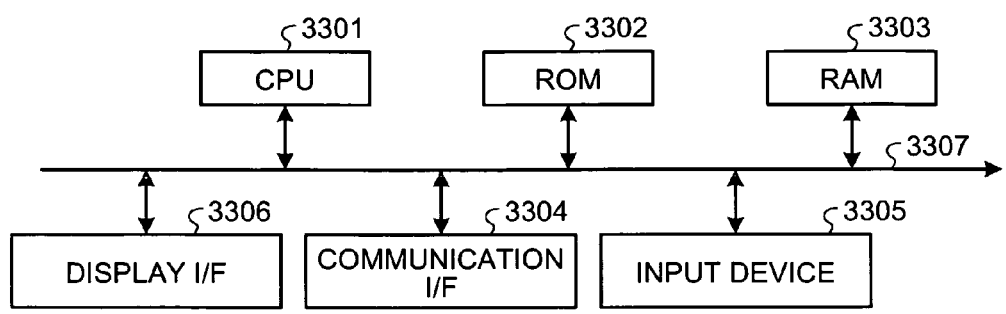
FIG. 33 is a diagram of a hardware configuration of a display processing apparatus.

Each of the display processing apparatuses according to the exemplary embodiments described above includes, as shown in FIG. 33, a CPU 3301, a ROM 3302, a RAM 3303, a display I/F 3306 that is connected to the display monitor 150, a communication I/F 3304, and an input device 3305. Each of the display processing apparatuses has a hardware configuration that employs a commonly-used computer.

A display processing computer program executed by any of the display processing apparatuses according to the exemplary embodiments described above is provided as being recorded on a computer-readable recording medium such as a CD-ROM, a FD, a CD-R, or a DVD, in an installable format or an executable format.

Another arrangement is acceptable in which the display processing computer program executed by any of the display processing apparatuses according to the exemplary embodiments described above is stored in a computer connected to a network such as the Internet and is provided as being downloaded via the network. Yet another arrangement is acceptable in which the display processing computer program executed by any of the display processing apparatuses according to the exemplary embodiments described above is provided or distributed via a network such as the Internet.

Further, yet another arrangement is acceptable in which the display processing computer program executed by any of the display processing apparatuses according to the exemplary embodiments described above is provided as being incorporated in a ROM or the like in advance.

The display processing computer program executed by any of the display processing apparatuses according to the exemplary embodiments described above has a module configuration including the constituent elements described above. In the actual hardware, the constituent elements described above are loaded into a main storage device when the CPU 3301 reads and executes the display processing computer program from the storage medium described above, so that the constituent elements described above are generated in the RAM (i.e., the main storage device) 3303.

The present invention is not limited to the exemplary embodiments described above. At the implementation stage of the invention, it is possible to materialize the present invention while applying modifications to the constituent elements without departing from the gist of the invention. Further, it is possible to form other various inventions by combining, as necessary, two or more of the constituent elements that are disclosed in the description of the exemplary embodiments.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A display controlling apparatus comprising:
a storing unit that stores first position information of pieces of data positioned in a predetermined n-dimensional virtual space to be displayed on a display device;
a specifying unit that specifies second position information in the virtual space, as information indicating positions of the pieces of data obtained after performing a rearranging process;
an intermediate specifying unit that specifies intermediate position information indicating temporary positions of the pieces of data corresponding to a time period during which the pieces of data are rearranged from positions indicated by the first position information into the positions indicated by the second position information, the intermediate position information indicating the positions in a m-dimensional virtual space, the m being smaller than the n by 1 or more;

a first transition calculator that calculates first transition paths of the pieces of data in transitions from the positions indicated by the first position information to the positions indicated by the intermediate position information;

a second transition calculator that calculates second transition paths of the pieces of data in transitions from the positions indicated by the intermediate position information to the positions indicated by the second position information; and an output unit that outputs display screen information containing the pieces of data that go through the transitions in the virtual spaces according to the first transition paths and the second transition paths.

2. The apparatus according to claim 1, further comprising:
a selecting unit that selects one of the pieces of data displayed in the positions indicated by the first position information as a piece of reference data that is used as a reference when the rearranging process is performed on other ones of the pieces of data, wherein the specifying unit specifies reference position information indicating a position of the piece of reference data obtained after performing the rearranging process, and specifies the second position information of the other pieces of data while using the specified reference position information of the piece of reference data as a reference, the intermediate specifying unit specifies the intermediate position information for the other pieces of data, excluding the piece of reference data selected by the selecting unit, and the first transition calculator and the second transition calculator calculate a transition path of the piece of reference data in a transition to the position indicated by the reference position information.

3. The apparatus according to claim 2, further comprising a reference transition calculator that calculates a transition path of the piece of reference data in a transition from the position indicated by the first position information to the position indicated by the second position information.

4. The apparatus according to claim 1, wherein the intermediate specifying unit specifies the intermediate position information based on attributes of the pieces of data.

5. The apparatus according to claim 1, wherein
the output unit further includes
a position calculator that calculates, for each of a plurality of time periods, transition position information indicating positions of the pieces of data during a transition process in which the pieces of data are rearranged from the positions indicated by the first position information into the positions indicated by the second position information according to the first transition paths and the second transition paths, and a generating unit that generates, for each of the plurality of time periods, display screen information in which the pieces of data are displayed in the positions indicated by the transition position information calculated by the position calculator.

6. The apparatus according to claim 5, wherein the position calculator determines an order in which transitions are made on the pieces of data according to one or both of the first transition paths and the second transition paths, and calculates the transition position information of the pieces of data corresponding to a situation in which the transitions are made on the pieces of data in the determined order.

7. The apparatus according to claim 5 further comprising:
a judging unit that judges whether the transition position information calculated by the position calculator matches the second position information indicating the positions of the pieces of data obtained after performing the rearranging process; and an updating unit that updates the first position information stored in the storing unit with the second position information, when a result of the judging by the judging unit is in affirmative.

8. The apparatus according to claim 1, wherein
the storing unit stores the first position information indicating the positions of the pieces of data positioned on virtual circular planes arranged along a three-dimensional conical surface in the n-dimensional virtual space, the specifying unit specifies the second position information indicating the positions on the virtual circular planes, to indicate the positions of the pieces of data obtained after performing the rearranging process, and the intermediate specifying unit specifies the intermediate position information in a plane coordinate system or a rectilinear coordinate system that is used as the virtual space of m-dimension.

9. A display controlling apparatus comprising:
a first display processing unit that displays, on a display device, a predetermined n-dimensional virtual space and a plurality of pieces of display data each representing a content in display positions, the display positions each indicating a position in which a corresponding one of the pieces of display data is displayed in the virtual space;

a selecting unit that selects one of the pieces of display data being displayed on the display device as a piece of reference display data to be used as a reference during a rearranging process;

a second display processing unit that, before the rearranging process is displayed while using the piece of reference display data selected by the selecting unit is used as a reference, changes the n-dimensional virtual space displayed on the display device to a m-dimensional virtual space, the m being smaller than the n by 1 or more, and performs a display in which transitions are made on display positions of the pieces of display data based on a predetermined rule;

a specifying unit that specifies display positions of other ones of the pieces of display data in the n-dimensional virtual space, while using the piece of reference display data selected by the selecting unit as a reference; and a third display processing unit that, after the second display processing unit has performed the display in which the transitions of the display positions are made, changes the m-dimensional virtual space being displayed on the display device to the n-dimensional virtual space, and performs a display in which the pieces of display data go through transitions to be rearranged into the display positions specified by the specifying unit.

10. A display controlling method comprising:
storing first position information of pieces of data positioned in a predetermined n-dimensional virtual space to be displayed on a display device;

specifying second position information in the virtual space, as information indicating positions of the pieces of data obtained after performing a rearranging process;

specifying intermediate position information indicating temporary positions of the pieces of data corresponding to a time period during which the pieces of data are rearranged from positions indicated by the first position information into the positions indicated by the second position information, the intermediate position information indicating the positions in a m-dimensional virtual space, the m being smaller than the n by 1 or more;

calculating first transition paths of the pieces of data in transitions from the positions indicated by the first position information to the positions indicated by the intermediate position information;

calculating second transition paths of the pieces of data in transitions from the positions indicated by the intermediate position information to the positions indicated by the second position information; and outputting display screen information containing the pieces of data that go through the transitions in the virtual spaces according to the first transition paths and the second transition paths.

11. The method according to claim 10, further comprising:

selecting one of the pieces of data displayed in the positions indicated by the first position information as a piece of reference data that is used as a reference when the rearranging process is performed on other ones of the pieces of data, wherein reference position information indicating a position of the piece of reference data obtained after performing the rearranging process is specified in the specifying, and the second position information of the other pieces of data while using the specified reference position information of the piece of reference data is specified in the specifying as a reference, the intermediate position information for the other pieces of data, excluding the piece of reference data selected by the selecting is specified in the specifying of intermediate position information, and a transition path of the piece of reference data in a transition to the position indicated by the reference position information is calculated in the calculating of first transition paths and in the calculating of second transition paths.

12. The method according to claim 11, further comprising calculating a transition path of the piece of reference data in a transition from the position indicated by the first position information to the position indicated by the second position information.

13. The method according to claim 10, wherein the intermediate position information is specified based on attributes of the pieces of data in the specifying of intermediate position information.

14. The method according to claim 10, wherein
the outputting further includes
calculating, for each of a plurality of time periods, transition position information indicating positions of the pieces of data during a transition process in which the pieces of data are rearranged from the positions indicated by the first position information into the positions indicated by the second position information according to the first transition paths and the second transition paths, and generating, for each of the plurality of time periods, display screen information in which the pieces of data are displayed in the positions indicated by the transition position information calculated by the position calculator.

15. The method according to claim 14, wherein an order in which transitions are made on the pieces of data according to one or both of the first transition paths and the second transition paths is determined, and the transition position information of the pieces of data corresponding to a situation in which the transitions are made on the pieces of data in the determined order is calculated, in the calculating of transition position information.

16. The method according to claim 14 further comprising:

judging whether the transition position information calculated in the calculating matches the second position information indicating the positions of the pieces of data obtained after performing the rearranging process; and updating the first position information stored in the storing with the second position information, when a result of the judging in the judging is in affirmative.

17. The method according to claim 10, wherein
the first position information indicating the positions of the pieces of data positioned on virtual circular planes arranged along a three-dimensional conical surface in the n-dimensional virtual space is stored in the storing, the second position information indicating the positions on the virtual circular planes, to indicate the positions of the pieces of data obtained after performing the rearranging process is specified in the specifying, and the intermediate position information in a plane coordinate system or a rectilinear coordinate system that is used as the m-dimensional virtual space is specified in the specifying of intermediate position information.

* * * * *